(12) United States Patent
Matsuki et al.

(10) Patent No.: US 12,173,196 B2
(45) Date of Patent: Dec. 24, 2024

(54) TWO-PART URETHANE ADHESIVE COMPOSITION

(71) Applicant: SIKA TECHNOLOGY AG, Baar (CH)

(72) Inventors: Yuichi Matsuki, Kanagawa (JP); Megumi Abe, Kanagawa (JP); Kazuki Miura, Kanagawa (JP)

(73) Assignee: SIKA TECHNOLOGY AG, Baar (CH)

( * ) Notice: Subject to any disclaimer, the term of this patent is extended or adjusted under 35 U.S.C. 154(b) by 7 days.

(21) Appl. No.: 17/950,535

(22) Filed: Sep. 22, 2022

(65) Prior Publication Data

US 2023/0193094 A1    Jun. 22, 2023

(30) Foreign Application Priority Data

Sep. 24, 2021 (JP) .................... 2021-155673
Sep. 9, 2022 (JP) .................... 2022-143610

(51) Int. Cl.

| | | |
|---|---|---|
| C09J 183/04 | (2006.01) | |
| C08G 18/10 | (2006.01) | |
| C08G 18/12 | (2006.01) | |
| C08G 18/22 | (2006.01) | |
| C08G 18/24 | (2006.01) | |
| C08G 18/28 | (2006.01) | |
| C08G 18/40 | (2006.01) | |
| C08G 18/42 | (2006.01) | |
| C08G 18/48 | (2006.01) | |
| C08G 18/50 | (2006.01) | |
| C08G 18/69 | (2006.01) | |
| C08G 18/73 | (2006.01) | |
| C08G 18/76 | (2006.01) | |
| C08G 18/78 | (2006.01) | |
| C08G 18/79 | (2006.01) | |
| C09J 4/00 | (2006.01) | |
| C09J 11/06 | (2006.01) | |
| C09J 175/04 | (2006.01) | |
| C09J 175/08 | (2006.01) | |

(52) U.S. Cl.
CPC ............ *C09J 183/04* (2013.01); *C08G 18/10* (2013.01); *C08G 18/12* (2013.01); *C08G 18/227* (2013.01); *C08G 18/246* (2013.01); *C08G 18/2825* (2013.01); *C08G 18/289* (2013.01); *C08G 18/4018* (2013.01); *C08G 18/4208* (2013.01); *C08G 18/4808* (2013.01); *C08G 18/4812* (2013.01); *C08G 18/482* (2013.01); *C08G 18/4825* (2013.01); *C08G 18/4845* (2013.01); *C08G 18/5021* (2013.01); *C08G 18/5024* (2013.01); *C08G 18/69* (2013.01); *C08G 18/73* (2013.01); *C08G 18/7671* (2013.01); *C08G 18/7831* (2013.01); *C08G 18/7837* (2013.01); *C08G 18/792* (2013.01); *C09J 4/00* (2013.01); *C09J 11/06* (2013.01); *C09J 175/04* (2013.01); *C09J 175/08* (2013.01); *C09J 2301/408* (2020.08)

(58) Field of Classification Search
CPC ... C09J 183/04; C09J 4/00; C09J 11/06; C09J 2301/408; C09J 175/04; C09J 175/08; C08G 18/10; C08G 18/227; C08G 18/246; C08G 18/2825; C08G 18/289; C08G 18/4018; C08G 18/4208; C08G 18/4808; C08G 18/482; C08G 18/5021; C08G 18/5024; C08G 18/69; C08G 18/73; C08G 18/7831; C08G 18/4825; C08G 18/12; C08G 18/4812; C08G 18/4845; C08G 18/7671; C08G 18/7837; C08G 18/792

See application file for complete search history.

(56) References Cited

U.S. PATENT DOCUMENTS 11,078,391 B2 *   8/2021   Abe ............... C08G 18/4825
2019/0016934 A1   1/2019   Yoshimoto et al.

FOREIGN PATENT DOCUMENTS

| JP | 2005-249957 A | 9/2005 |
|---|---|---|
| JP | 2009-156944 A | 7/2009 |
| JP | 2011-68719 A | 4/2011 |
| JP | 6621847 B2 | 12/2019 |

\* cited by examiner

*Primary Examiner* — Rabon A Sergent
(74) *Attorney, Agent, or Firm* — Oliff PLC

(57) ABSTRACT

There is provided a two-part urethane adhesive composition including: a main agent containing a polyisocyanate component (A); and a curing agent containing water and an active hydrogen-containing compound (B). The (B) contains a compound represented by Formula (4); the (A) contains a urethane prepolymer (A-3); an average active hydrogen concentration of the (B) is 0.50 to 3.50 mol/kg; an average active hydrogen concentration of the (B) and the water is 2.00 to 8.00 mol/kg. The main agent and the curing agent are mixed in such amounts as to satisfy conditions that: a ratio of the number of isocyanate groups of the (A) to the number of active hydrogens of the (B) is 1 to 5; and a ratio of the number of isocyanate groups of the (A) to the total number of active hydrogens of the (B) and the water is 0.5 to 2.5.

12 Claims, 37 Drawing Sheets

Table 1 (main agent)

| Main agent | | | Ratio R1 (NCO/H) | NCO% | Example 1 | Example 15 | Example 2 |
|---|---|---|---|---|---|---|---|
| Polyisocyanate component (A) | Polyisocyanate component (A1) | | 1.68 | 1.80 | 33.66 | 33.66 | 33.66 |
| | Polyisocyanate component (A2) | | 8.00 | 11.73 | 23.93 | 23.93 | 23.93 |
| Plasticizer | DINP | | — | — | 2.31 | 2.31 | 2.31 |
| Aliphatic diisocyanate derivative (C) | D-376N | | — | 23.6 | 0.05 | 0.05 | 0.05 |
| Silane coupling agent (F)*2 | Silane coupling agent (F-2-1) | X-12-1056ES | | | 0.75 | 0.75 | 0.75 |
| | Silane coupling agent (F-1-1) | Adduct of biuret of HDI and 3-(N-phenyl)aminopropyltrimethoxysilane | | 10.55 | | | |
| | Silane coupling agent (F-1-2) | Adduct of isocyanurate of HDI and 3-(N-phenyl)aminopropyltrimethoxysilane | | 10.36 | | | |
| Compound having skeleton derived from monoterpene (E1) | | | | | 0.50 | 0.50 | 0.50 |
| Filler | Filler 1 (carbon) | #200 | | | 19.93 | 19.93 | 19.93 |
| | Filler 2 (calcium carbonate) | Super S | | | 18.68 | 18.68 | 18.68 |
| Metal catalyst | Metal catalyst 1 | U-600 | | | | | |
| | Metal catalyst 2 | DOTL (U-810) | | | 0.004 | 0.004 | 0.004 |
| Amine-based catalyst | Amine-based catalyst 1 | X-DM | | | 0.068 | 0.068 | 0.068 |
| | Amine-based catalyst 2 | BL-19 | | | | | |
| | Amine-based catalyst 3 | DMDEE | | | 0.101 | 0.101 | 0.101 |
| Total of main agent (parts by mass) | | | | | 100.0 | 100.0 | 100.0 |
| Number of moles of NCO derived from polyisocyanate component (A) in 100 g of main agent | | | | | 0.0144 | 0.0144 | 0.0144 |
| Number of moles of NCO derived from aliphatic isocyanate (C) and silane coupling agent (F)*2 in 100 g of main agent | | | | | 0.0149 | 0.0149 | 0.0149 |
| Number of moles of NCO in 100 g of main agent (in total) | | | | | 0.0293 | 0.0293 | 0.0293 |
| Content of aliphatic diisocyanate derivative (C) (%) | | | | | 2.31 | 2.31 | 2.31 |
| Content of silane coupling agent (F)*2 (%) | | | | | 0.80 | 0.80 | 0.80 |

FIG. 3A

Table 1 (main agent)

| Main agent | | | Ratio R1 (NCO/H) | NCO % | Example 3 | Example 4 | Example 16 |
|---|---|---|---|---|---|---|---|
| Polyisocyanate component (A) | Polyisocyanate component (A1) | | 1.68 | 1.80 | 33.66 | 33.66 | 33.66 |
| | Polyisocyanate component (A2) | | 8.00 | 11.73 | | | |
| Plasticizer | DINP | | — | — | 23.93 | 23.93 | 23.93 |
| Aliphatic diisocyanate derivative (C) | D-376N | | — | 23.6 | 2.31 | 2.31 | 2.31 |
| Silane coupling agent (F)² | Silane coupling agent (F-2-1) | | X-12-1056ES | 10.55 | 0.05 | 0.05 | 0.05 |
| | Silane coupling agent (F-1-1) | | Adduct of biuret of HDI and 3-(N-phenyl)aminopropyltrimethoxysilane | 10.36 | | 0.75 | 0.75 |
| | Silane coupling agent (F-1-2) | | Adduct of isocyanurate of HDI and 3-(N-phenyl)aminopropyltrimethoxysilane | | 0.75 | | |
| Compound having skeleton derived from monoterpene (E1) | | | | | 0.50 | 0.50 | 0.50 |
| Filler | Filler 1 (carbon) | | #200 | | 19.93 | 19.93 | 19.93 |
| | Filler 2 (calcium carbonate) | | Super S | | 18.68 | 18.68 | 18.68 |
| Metal catalyst | Metal catalyst 1 | | U-600 | | | | |
| | Metal catalyst 2 | DOTL (U-810) | | | 0.004 | 0.004 | 0.004 |
| Amine-based catalyst | Amine-based catalyst 1 | | X-DM | | 0.068 | 0.068 | 0.068 |
| | Amine-based catalyst 2 | | BL-19 | | | | |
| | Amine-based catalyst 3 | | DMDEE | | 0.101 | 0.101 | 0.101 |
| Total of main agent (parts by mass) | | | | | 100.0 | 100.0 | 100.0 |
| Number of moles of NCO derived from polyisocyanate component (A) in 100 g of main agent | | | | | 0.0144 | 0.0144 | 0.0144 |
| Number of moles of NCO derived from aliphatic isocyanate (C) and silane coupling agent (F)² in 100 g of main agent | | | | | 0.0148 | 0.0149 | 0.0149 |
| Number of moles of NCO in 100 g of main agent (in total) | | | | | 0.0293 | 0.0293 | 0.0293 |
| Content of aliphatic diisocyanate derivative (C) (%) | | | | | 2.31 | 2.31 | 2.31 |
| Content of silane coupling agent (F)² (%) | | | | | 0.80 | 0.80 | 0.80 |

FIG. 3B

Table 1 (main agent)

| Main agent | | | Ratio R1 (NCO/H) | NCO% | Example 5 | Comparative Example 1 | Comparative Example 2 |
|---|---|---|---|---|---|---|---|
| Polyisocyanate component (A) | Polyisocyanate component (A1) | | 1.68 | 1.80 | 33.66 | 33.66 | 33.66 |
| | Polyisocyanate component (A2) | | 8.00 | 11.73 | | | |
| Plasticizer | DINP | | — | — | 23.93 | 23.93 | 23.93 |
| Aliphatic diisocyanate derivative (C) | D-376N | | — | 23.6 | 2.31 | 2.31 | 2.31 |
| Silane coupling agent (F)² | Silane coupling agent (F-2-1) | | X-12-1056ES | | 0.05 | 0.05 | 0.05 |
| | Silane coupling agent (F-1-1) | | Adduct of biuret of HDI and 3-(N-phenyl)aminopropyltrimethoxysilane | 10.55 | 0.75 | 0.75 | 0.75 |
| | Silane coupling agent (F-1-2) | | Adduct of isocyanurate of HDI and 3-(N-phenyl)aminopropyltrimethoxysilane | 10.36 | | | |
| Compound having skeleton derived from monoterpene (E1) | | | | | 0.50 | 0.50 | 0.50 |
| Filler | Filler 1 (carbon) | | #200 | | 19.93 | 19.93 | 19.93 |
| | Filler 2 (calcium carbonate) | | Super S | | 18.68 | 18.68 | 18.68 |
| Metal catalyst | Metal catalyst 1 | | U-600 | | | | |
| | Metal catalyst 2 | | DOTL (U-810) | | 0.004 | 0.004 | 0.004 |
| Amine-based catalyst | Amine-based catalyst 1 | | X-DM | | 0.068 | 0.068 | 0.068 |
| | Amine-based catalyst 2 | | BL-19 | | 0.101 | 0.101 | 0.101 |
| | Amine-based catalyst 3 | | DMDEE | | | | |
| Total of main agent (parts by mass) | | | | | 100.0 | 100.0 | 100.0 |
| Number of moles of NCO derived from polyisocyanate component (A) in 100 g of main agent | | | | | 0.0144 | 0.0144 | 0.0144 |
| Number of moles of NCO derived from aliphatic isocyanate (C) and silane coupling agent (F)² in 100 g of main agent | | | | | 0.0149 | 0.0149 | 0.0149 |
| Number of moles of NCO in 100 g of main agent (in total) | | | | | 0.0293 | 0.0293 | 0.0293 |
| Content of aliphatic diisocyanate derivative (C) (%) | | | | | 2.31 | 2.31 | 2.31 |
| Content of silane coupling agent (F)² (%) | | | | | 0.80 | 0.80 | 0.80 |

FIG. 3C

Table 1 (curing agent)

| Curing agent | | Active hydrogen concentration (mol/kg) | OH value mgKOH/g | Example 1 | Example 15 | Example 2 |
|---|---|---|---|---|---|---|
| Active hydrogen-containing compound (B1) | EXCENOL 837 | 0.50 | 28 | | | 57.61 |
| Active hydrogen-containing compound (B2) | EXCENOL 450ED | 8.02 | 450 | 57.61 | 57.61 | 2.57 |
| Active hydrogen-containing compound (B3) | Adeka Polyether BM-34 | 14.74 | 827 | 2.57 | 2.57 | |
| Active hydrogen-containing compound (B4) | Poly bd R15HT | 1.83 | 103 | 4.00 | 4.00 | |
| Active hydrogen-containing compound (B5) | Poly bd R45HT | 0.83 | 47 | | | |
| Active hydrogen-containing compound (B6) | EXCENOL 1020 | 2.00 | 112 | | | |
| Active hydrogen-containing compound (B7) | HS 2N-226P | 0.94 | 53 | | | |
| Active hydrogen-containing compound (B8) | JEFFAMINE D-400 | 9.30 | 522 | | | 1.00 |
| Comparative active hydrogen-containing compound | EXCENOL 450SN | 8.02 | 450 | | | |
| Water[1] | | 111.1 | 6233 | 1.28 | 0.25 | 1.28 |
| Compound having skeleton derived from monoterpene (E2) | | | | 0.50 | 0.50 | 0.50 |
| Alkoxysilyl group- and/or silanol group-containing compound (D)[3] | Compound (D-1-1) containing amino group and/or imino group | Solid content of D-1-1 (30%) | | | | |
| | | Solvent of D-1-1 | Water[4] | | | |
| | Compound (D-1-2) containing amino group and/or imino group | Solid content of D-1-2 (15%) Solvent: alcohol | | 0.08 | 0.08 | 0.08 |
| | | Solvent of D-1-2 | Ethanol | 0.41 | 0.41 | 0.41 |
| | | Solvent of D-1-2 | Methanol | 0.03 | 0.03 | 0.03 |
| | Compound (D-1-3) N-2-(aminoethyl)-3-aminopropyltrimethoxysilane | | | | | |
| Filler 3 (calcium carbonate) | KALFINE 200 | | | 32.90 | 33.93 | 35.90 |
| Amine-based catalyst 4 | TEDA | | | 0.50 | 0.50 | 0.50 |
| Metal catalyst 4 | U-220H | | | 0.04 | 0.04 | 0.04 |
| Metal catalyst 2 | U-810 | | | 0.04 | 0.04 | 0.04 |

FIG. 3D

| Table 1 (curing agent) | Example 1 | Example 15 | Example 2 |
|---|---|---|---|
| Total of curing agent (parts by mass) | 100.0 | 100.0 | 100.0 |
| Average active hydrogen concentration (BH-c) of active hydrogen-containing compound (B) (mol/kg) | 1.69 | 1.69 | 0.96 |
| Average active hydrogen concentration (BWH-c) of active hydrogen-containing compound (B) and water (mol/kg) * The water herein represents the total of water*1 and water*4 | 3.83 | 2.11 | 3.22 |
| Content of water (total of water*1 and water*4) (%) | 1.28 | 0.25 | 1.28 |
| Content of alkoxysilyl group- or silanol group-containing compound (D)*3 (%) | 0.08 | 0.08 | 0.08 |
| Number of moles of active hydrogens of active hydrogen-containing compound (B) in 100 g of curing agent | 0.1083 | 0.1083 | 0.0587 |
| Number of moles of (theoretical) active hydrogens of active hydrogen-containing compound (B) and (theoretical) active hydrogens of water in 100 g of curing agent * The water herein represents the total of water*1 and water*4 | 0.2505 | 0.1361 | 0.2009 |
| Ratio of number of moles of (theoretical) active hydrogens of water to number of total moles of active hydrogens of active hydrogen-containing compound (B) and (theoretical) active hydrogens of water in 100 g of curing agent (%) * The water herein represents the total of water*1 and water*4 | 56.8 | 20.4 | 70.8 |
| Number of total moles of active hydrogens of active hydrogen-containing compounds (B2), (B3), and (B8) in 100 g of curing agent | 0.080 | 0.080 | 0.030 |
| Ratio of number of total moles of active hydrogens of active hydrogen-containing compounds (B2), (B3), and (B8) to number of total moles of active hydrogens of active hydrogen-containing compound (B) and (theoretical) active hydrogens of water in 100 g of curing agent (%) * The water herein represents the total of water*1 and water*4 | 31.8 | 58.5 | 14.9 |

Table 1 (curing agent)

| Curing agent | | Active hydrogen concentration (mol/kg) | OH value mgKOH/g | Example 3 | Example 4 | Example 16 |
|---|---|---|---|---|---|---|
| Active hydrogen-containing compound (B1) | EXCENOL 837 | 0.50 | 28 | 57.61 | 57.61 | 57.61 |
| Active hydrogen-containing compound (B2) | EXCENOL 450ED | 8.02 | 450 | 2.57 | 2.57 | 2.57 |
| Active hydrogen-containing compound (B3) | Adeka Polyether BM-34 | 14.74 | 827 | 4.00 | 4.00 | 4.00 |
| Active hydrogen-containing compound (B4) | Poly bd R15HT | 1.83 | 103 | | | |
| Active hydrogen-containing compound (B5) | Poly bd R45HT | 0.83 | 47 | | | |
| Active hydrogen-containing compound (B6) | EXCENOL 1020 | 2.00 | 112 | | | |
| Active hydrogen-containing compound (B7) | HS 2N-226P | 0.94 | 53 | | | |
| Active hydrogen-containing compound (B8) | JEFFAMINE D-400 | 9.30 | 522 | | | |
| Comparative active hydrogen-containing compound | EXCENOL 450SN | 8.02 | 450 | | | |
| Water*1 | | 111.1 | 6233 | 1.28 | 1.14 | 0.25 |
| Compound having skeleton derived from monoterpene (E2) | | | | 0.50 | 0.50 | 0.50 |
| Alkoxysilyl group- and/or silanol group-containing compound (D)*3 | Compound (D-1-1) containing amino group and/or imino group | Solid content of D-1-1 (30%) Solvent of D-1-1 | Water*4 | 0.06 0.14 | 0.06 0.14 | 0.06 0.14 |
| | Compound (D-1-2) containing amino group and/or imino group | Solid content of D-1-2 (15%) Solvent: alcohol Solvent of D-1-2 Solvent of D-1-2 | Ethanol Methanol | 0.08 0.41 0.03 | 0.41 0.03 | |
| | Compound (D-1-3) N-2-(aminoethyl)-3-aminopropyltrimethoxysilane | | | | | |
| Filler 3 (calcium carbonate) | KALFINE 200 | | | 32.90 | 33.00 | 34.33 |
| Amine-based catalyst 4 | TEDA | | | 0.50 | 0.50 | 0.50 |
| Metal catalyst 4 | U-220H | | | 0.04 | 0.04 | 0.04 |
| Metal catalyst 2 | U-810 | | | 0.04 | 0.04 | 0.04 |

| Table 1 (curing agent) | Example 3 | Example 4 | Example 16 |
|---|---|---|---|
| Total of curing agent (parts by mass) | 100.0 | 100.0 | 100.0 |
| Average active hydrogen concentration (BH-c) of active hydrogen-containing compound (B) (mol/kg) | 1.69 | 1.69 | 1.69 |
| Average active hydrogen concentration (BWH-c) of active hydrogen-containing compound (B) and water (mol/kg) * The water herein represents the total of water*1 and water*4 | 3.83 | 3.84 | 2.35 |
| Content of water (total of water*1 and water*4) (%) | 1.28 | 1.28 | 0.39 |
| Content of alkoxysilyl group- or silanol group-containing compound (D)*3 (%) | 0.08 | 0.06 | 0.06 |
| Number of moles of active hydrogens of active hydrogen-containing compound (B) in 100 g of curing agent | 0.1083 | 0.1083 | 0.1083 |
| Number of total moles of active hydrogens of active hydrogen-containing compound (B) and (theoretical) active hydrogens of water in 100 g of curing agent * The water herein represents the total of water*1 and water*4 | 0.2505 | 0.2505 | 0.1517 |
| Ratio of number of (theoretical) active hydrogens of water to number of total moles of active hydrogens of active hydrogen-containing compound (B) and (theoretical) active hydrogens of water in 100 g of curing agent (%) * The water herein represents the total of water*1 and water*4 | 56.8 | 56.8 | 28.6 |
| Number of total moles of active hydrogens of active hydrogen-containing compounds (B2), (B3), and (B8) in 100 g of curing agent | 0.080 | 0.080 | 0.080 |
| Ratio of number of total moles of active hydrogens of active hydrogen-containing compounds (B2), (B3), and (B8) to number of total moles of active hydrogens of active hydrogen-containing compound (B) and (theoretical) active hydrogens of water in 100 g of curing agent (%) * The water herein represents the total of water*1 and water*4 | 31.8 | 31.8 | 52.5 |

FIG. 3G

Table 1 (curing agent)

| Curing agent | | Active hydrogen concentration (mol/kg) | OH value mgKOH/g | Example 5 | Comparative Example 1 | Comparative Example 2 |
|---|---|---|---|---|---|---|
| Active hydrogen-containing compound (B1) | EXCENOL 837 | 0.50 | 28 | 57.61 | 57.61 | 57.61 |
| Active hydrogen-containing compound (B2) | EXCENOL 450ED | 8.02 | 450 | 2.57 | 2.57 | 2.57 |
| Active hydrogen-containing compound (B3) | Adeka Polyether BM-34 | 14.74 | 827 | 4.00 | 4.00 | 4.00 |
| Active hydrogen-containing compound (B4) | Poly bd R15HT | 1.83 | 103 | | | |
| Active hydrogen-containing compound (B5) | Poly bd R45HT | 0.83 | 47 | | | |
| Active hydrogen-containing compound (B6) | EXCENOL 1020 | 2.00 | 112 | | | |
| Active hydrogen-containing compound (B7) | HS 2N-226P | 0.94 | 53 | | | |
| Active hydrogen-containing compound (B8) | JEFFAMINE D-400 | 9.30 | 522 | | | |
| Comparative active hydrogen-containing compound | EXCENOL 450SN | 8.02 | 450 | | | |
| Water[*1] | | 111.1 | 6233 | 1.28 | 0.00 | 1.28 |
| Compound having skeleton derived from monoterpene (E2) | | | | 0.50 | 0.50 | 0.50 |
| Alkoxysilyl group- and/or silanol group-containing compound (D)[*3] | Compound (D-1-1) containing amino group and/or imino group | Solid content of D-1-1 (30%) | | | | |
| | | Solvent of D-1-1 | Water[*4] | | | |
| | Compound (D-1-2) containing amino group and/or imino group | Solid content of D-1-2 (15%) | | 0.08 | 0.08 | 0.08 |
| | | Solvent: alcohol | | | | |
| | | Solvent of D-1-2 | Ethanol | 0.41 | 0.41 | 0.41 |
| | | Solvent of D-1-2 | Methanol | 0.03 | 0.03 | 0.03 |
| | Compound (D-1-3) N-2-(aminoethyl)-3-aminopropyltrimethoxysilane | | | 0.10 | | |
| Filler 3 (calcium carbonate) | KALFINE 200 | | | 33.40 | 34.18 | 32.90 |
| Amine-based catalyst 4 | TEDA | | | 0.50 | 0.50 | 0.50 |
| Metal catalyst 4 | U-220H | | | 0.04 | 0.04 | 0.04 |
| Metal catalyst 2 | U-810 | | | 0.04 | 0.04 | 0.04 |

FIG. 3H

| Table 1 (curing agent) | Example 5 | Comparative Example 1 | Comparative Example 2 |
|---|---|---|---|
| Total of curing agent (parts by mass) | 100.0 | 100.0 | 100.0 |
| Average active hydrogen concentration (BH-c) of active hydrogen-containing compound (B) (mol/kg) | 1.69 | 1.69 | 1.69 |
| Average active hydrogen concentration (BWH-c) of active hydrogen-containing compound (B) and water (mol/kg)<br>* The water herein represents the total of water[1] and water[4] | 3.83 | 1.69 | 3.83 |
| Content of water (total of water[1] and water[4]) (%) | 1.28 | 0.00 | 1.28 |
| Content of alkoxysilyl group- or silanol group-containing compound (D)[3] (%) | 0.10 | 0.08 | 0.08 |
| Number of moles of active hydrogens of active hydrogen-containing compound (B) in 100 g of curing agent | 0.1083 | 0.1083 | 0.1083 |
| Number of total moles of (theoretical) active hydrogens of active hydrogen-containing compound (B) and (theoretical) active hydrogens of water in 100 g of curing agent<br>* The water herein represents the total of water[1] and water[4] | 0.2505 | 0.1083 | 0.2505 |
| Ratio of number of total moles of (theoretical) active hydrogens of water to number of total moles of active hydrogens of active hydrogen-containing compound (B) and (theoretical) active hydrogens of water in 100 g of curing agent (%)<br>* The water herein represents the total of water[1] and water[4] | 56.8 | 0.0 | 56.8 |
| Number of total moles of active hydrogens of active hydrogen-containing compounds (B2), (B3), and (B8) in 100 g of curing agent | 0.080 | 0.080 | 0.080 |
| Ratio of number of total moles of active hydrogens of active hydrogen-containing compounds (B2), (B3), and (B8) to number of total moles of active hydrogens of active hydrogen-containing compound (B) and (theoretical) active hydrogens of water in 100 g of curing agent (%)<br>* The water herein represents the total of water[1] and water[4] | 31.8 | 73.5 | 31.8 |

FIG. 3I

| Table 1 (mixture of main agent and curing agent) | | Example 1 | Example 15 | Example 2 |
|---|---|---|---|---|
| Mixing ratio of main agent and curing agent | Main agent/curing agent = mixing ratio (mass ratio) | 10/1 | 10/1 | 10/1 |
| | Ratio R2 in mixture of main agent/curing agent (NCO/H) | 2.70 | 2.70 | 4.99 |
| | Ratio R3 in mixture of main agent/curing agent (NCO/H) (including all water) | 1.17 | 2.15 | 1.46 |

| Table 1 - continuation (evaluation result) | | Example 1 | Example 15 | Example 2 |
|---|---|---|---|---|
| Creep test 1 (with primer) (initial): 20°C65%RH; after 30 minutes | Substrate obtained by applying primer on surface-treated resin/ED sheet | Test temp. 20°C | A | B | A |
| Creep test 2 (with primer) (cured): 20°C65%RH; after 24 hours | Substrate obtained by applying primer on surface-treated resin/ED sheet | Test temp. 80°C | A | B | A |
| Creep test 3 (primerless) (initial): 20°C65%RH; after 30 minutes | Surface-treated resin substrate (primerless)/ED sheet | Test temp. 20°C | A | B | A |
| Creep test 4 (primerless) (cured): 20°C65%RH; after 24 hours | Surface-treated resin substrate (primerless)/ED sheet | Test temp. 80°C | A | B | A |
| Creep test 5 (Creep test 3 + Evaluating heaviness of a weight that fell after start of creep test) (primerless) (initial): 20°C65%RH; after 30 minutes | Surface-treated resin substrate (primerless)/ED sheet | Test temp. 20°C | A | C | B |
| Adhesion force (shear strength 1 week after curing at room temperature) | | 4.0MPa | 3.0MPa | 3.6MPa |

FIG. 3J

| Table 1 (mixture of main agent and curing agent) | | Example 3 | Example 4 | Example 16 |
|---|---|---|---|---|
| Mixing ratio of main agent and curing agent | Main agent/curing agent = mixing ratio (mass ratio) | 10/1 | 10/1 | 10/1 |
| | Ratio R2 in mixture of main agent/curing agent (NCO/H) | 2.70 | 2.70 | 2.70 |
| | Ratio R3 in mixture of main agent/curing agent (NCO/H) (including all water) | 1.17 | 1.17 | 1.93 |

| Table 1 - continuation (evaluation result) | | Example 3 | Example 4 | Example 16 |
|---|---|---|---|---|
| Creep test 1 (with primer) (initial): 20°C65%RH; after 30 minutes | Substrate obtained by applying primer on surface-treated resin/ED sheet | Test temp. 20°C | A | A | A |
| Creep test 2 (with primer) (cured): 20°C65%RH; after 24 hours | Substrate obtained by applying primer on surface-treated resin/ED sheet | Test temp. 80°C | A | A | B |
| Creep test 3 (primerless) (initial): 20°C65%RH; after 30 minutes | Surface-treated resin substrate (primerless)/ED sheet | Test temp. 20°C | A | A | A |
| Creep test 4 (primerless) (cured): 20°C65%RH; after 24 hours | Surface-treated resin substrate (primerless)/ED sheet | Test temp. 80°C | A | A | B |
| Creep test 5 (Creep test 3 + Evaluating heaviness of a weight that fell after start of creep test) (primerless) (initial): 20°C65%RH; after 30 minutes | Surface-treated resin substrate (primerless)/ED sheet | Test temp. 20°C | A | A | B |
| Adhesion force (shear strength 1 week after curing at room temperature) | | | 3.0MPa | 3.9MPa | 3.1MPa |

FIG. 3K

Table 1 (mixture of main agent and curing agent)

| | | Example 5 | Comparative Example 1 | Comparative Example 2 |
|---|---|---|---|---|
| Mixing ratio of main agent and curing agent | Main agent/curing agent = mixing ratio (mass ratio) | 10/1 | 10/1 | 10/0.4 |
| | Ratio R2 in mixture of main agent/curing agent (NCO/H) | 2.70 | 2.70 | 6.76 |
| | Ratio R3 in mixture of main agent/curing agent (NCO/H including all water) | 1.17 | 2.70 | 2.92 |

Table 1 - continuation (evaluation result)

| | | Example 5 | Comparative Example 1 | Comparative Example 2 |
|---|---|---|---|---|
| Creep test 1 (with primer) (initial): 20°C65%RH; after 30 minutes | Substrate obtained by applying primer on surface-treated resin/ED sheet | Test temp. 20°C | A | B | D |
| Creep test 2 (with primer) (cured): 20°C65%RH; after 24 hours | Substrate obtained by applying primer on surface-treated resin/ED sheet | Test temp. 80°C | A | B | B |
| Creep test 3 (primerless) (initial): 20°C65%RH; after 30 minutes | Surface-treated resin substrate (primerless)/ED sheet | Test temp. 20°C | A | D | D |
| Creep test 4 (primerless) (cured): 20°C65%RH; after 24 hours | Surface-treated resin substrate (primerless)/ED sheet | Test temp. 80°C | A | C | B |
| Creep test 5 (Creep test 3 + Evaluating heaviness of a weight that fell after start of creep test) (primerless) (initial): 20°C65%RH; after 30 minutes | Surface-treated resin substrate (primerless)/ED sheet | Test temp. 20°C | B | E | E |
| Adhesion force (shear strength 1 week after curing at room temperature) | | | 3.0MPa | 2.2MPa | 4.0MPa |

FIG. 3L

Table 2 (main agent)

| Main agent | | Ratio R1 (NCO/H) | NCO % | Example 6 | Example 7 | Example 8 |
|---|---|---|---|---|---|---|
| Polyisocyanate component (A) | Polyisocyanate component (A1) | 1.68 | 1.80 | 33.40 | 33.40 | 33.40 |
| | Polyisocyanate component (A2) | 8.00 | 11.73 | | | |
| Plasticizer | DINP | — | — | 22.97 | 22.97 | 22.97 |
| Aliphatic diisocyanate derivative (C) | D-376N | — | 23.6 | 1.97 | 1.97 | 1.97 |
| Silane coupling agent (F)² | Silane coupling agent (F-2-1) | X-12-1056ES | | | | |
| | Silane coupling agent (F-1-1) | Adduct of biuret of HDI and 3-(N-phenyl)aminopropyltrimethoxysilane | 10.55 | 2.60 | 2.60 | 2.60 |
| | Silane coupling agent (F-1-2) | Adduct of isocyanurate of HDI and 3-(N-phenyl)aminopropyltrimethoxysilane | 10.36 | | | |
| Compound having skeleton derived from monoterpene (E1) | | | | 0.48 | 0.48 | 0.48 |
| Filler | Filler 1 (carbon) | #200 | | 19.77 | 19.77 | 19.77 |
| | Filler 2 (calcium carbonate) | Super S | | 18.54 | 18.54 | 18.54 |
| Metal catalyst | Metal catalyst 1 | DOTL (U-810) | | 0.004 | 0.004 | 0.004 |
| | Metal catalyst 2 | U-600 | | | | |
| Amine-based catalyst | Amine-based catalyst 1 | X-DM | | 0.26 | 0.26 | 0.26 |
| | Amine-based catalyst 2 | BL-19 | | 0.01 | 0.01 | 0.01 |
| | Amine-based catalyst 3 | DMDEE | | | | |
| Total of main agent (parts by mass) | | | | 100.0 | 100.0 | 100.0 |
| Number of moles of NCO derived from polyisocyanate component (A) in 100 g of main agent | | | | 0.0143 | 0.0143 | 0.0143 |
| Number of moles of NCO derived from aliphatic isocyanate (C) and silane coupling agent (F)² in 100 g of main agent | | | | 0.0176 | 0.0176 | 0.0176 |
| Number of moles of NCO in 100 g of main agent (in total) | | | | 0.0319 | 0.0319 | 0.0319 |
| Content of aliphatic diisocyanate derivative (C) (%) | | | | 1.97 | 1.97 | 1.97 |
| Content of silane coupling agent (F)² (%) | | | | 2.60 | 2.60 | 2.60 |

FIG. 4A

Table 2 (main agent)

| Main agent | | Ratio R1 (NCO/H) | NCO % | Example 9 | Example 10 | Example 11 |
|---|---|---|---|---|---|---|
| Polyisocyanate component (A) | Polyisocyanate component (A1) | 1.68 | 1.80 | 33.40 | 33.40 | 33.40 |
| | Polyisocyanate component (A2) | 8.00 | 11.73 | | | |
| Plasticizer | DINP | — | — | 22.97 | 22.97 | 22.97 |
| Aliphatic diisocyanate derivative (C) | D-376N | — | 23.6 | 1.97 | 1.97 | 1.97 |
| | Silane coupling agent (F-2-1) | X-12-1056ES | | | | |
| Silane coupling agent (F)² | Silane coupling agent (F-1-1) | Adduct of buret of HDI and 3-(N-phenyl)aminopropyltrimethoxysilane | 10.55 | | | 2.60 |
| | Silane coupling agent (F-1-2) | Adduct of isocyanurate of HDI and 3-(N-phenyl)aminopropyltrimethoxysilane | 10.36 | 2.60 | 2.60 | |
| Compound having skeleton derived from monoterpene (E1) | | | | 0.48 | 0.48 | 0.48 |
| Filler | Filler 1 (carbon) | #200 | | 19.77 | 19.77 | 19.77 |
| | Filler 2 (calcium carbonate) | Super S | | 18.54 | 18.54 | 18.54 |
| Metal catalyst | Metal catalyst 1 | U-600 | | | | |
| | Metal catalyst 2 | DOTL (U-810) | | 0.004 | 0.004 | 0.004 |
| Amine-based catalyst | Amine-based catalyst 1 | X-DM | | 0.26 | 0.26 | 0.26 |
| | Amine-based catalyst 2 | BL-19 | | 0.01 | 0.01 | 0.01 |
| | Amine-based catalyst 3 | DMDEE | | | | |
| Total of main agent (parts by mass) | | | | 100.0 | 100.0 | 100.0 |
| Number of moles of NCO derived from polyisocyanate component (A) in 100 g of main agent | | | | 0.0143 | 0.0143 | 0.0143 |
| Number of moles of NCO derived from aliphatic isocyanate (C) and silane coupling agent (F)² in 100 g of main agent | | | | 0.0175 | 0.0176 | 0.0176 |
| Number of moles of NCO in 100 g of main agent (in total) | | | | 0.0318 | 0.0319 | 0.0319 |
| Content of aliphatic diisocyanate derivative (C) (%) | | | | 1.97 | 1.97 | 1.97 |
| Content of silane coupling agent (F)² (%) | | | | 2.60 | 2.60 | 2.60 |

FIG. 4B

| Table 2 (main agent) | | Ratio R1 (NCO/H) | NCO% | Comparative Example 3 | Comparative Example 4 |
|---|---|---|---|---|---|
| Main agent | | | | | |
| Polyisocyanate component (A) | Polyisocyanate component (A1) | 1.68 | 1.80 | 33.40 | 33.40 |
| | Polyisocyanate component (A2) | 8.00 | 11.73 | | |
| Plasticizer | DINP | — | — | 22.97 | 22.97 |
| Aliphatic diisocyanate derivative (C) | D-376N | — | 23.6 | 1.97 | 1.97 |
| Silane coupling agent (F)² | Silane coupling agent (F-2-1) | X-12-1056ES | | | |
| | Silane coupling agent (F-1-1) | Adduct of biuret of HDI and 3-(N-phenyl)aminopropyltrimethoxysilane | 10.55 | 2.60 | 2.60 |
| | Silane coupling agent (F-1-2) | Adduct of isocyanurate of HDI and 3-(N-phenyl)aminopropyltrimethoxysilane | 10.36 | | |
| Compound having skeleton derived from monoterpene (E1) | | | | 0.48 | 0.48 |
| Filler | Filler 1 (carbon) | #200 | | 19.77 | 19.77 |
| | Filler 2 (calcium carbonate) | Super S | | 18.54 | 18.54 |
| Metal catalyst | Metal catalyst 1 | U-600 | | | |
| | Metal catalyst 2 | DOTL (U-810) | | 0.004 | 0.004 |
| Amine-based catalyst | Amine-based catalyst 1 | X-DM | | 0.26 | 0.26 |
| | Amine-based catalyst 2 | BL-19 | | 0.01 | 0.01 |
| | Amine-based catalyst 3 | DMDEE | | | |
| Total of main agent (parts by mass) | | | | 100.0 | 100.0 |
| Number of moles of NCO derived from polyisocyanate component (A) in 100 g of main agent | | | | 0.0143 | 0.0143 |
| Number of moles of NCO derived from aliphatic isocyanate (C) and silane coupling agent (F)² in 100 g of main agent | | | | 0.0176 | 0.0176 |
| Number of moles of NCO in 100 g of main agent (in total) | | | | 0.0319 | 0.0319 |
| Content of aliphatic diisocyanate derivative (C) (%) | | | | 1.97 | 1.97 |
| Content of silane coupling agent (F)² (%) | | | | 2.60 | 2.60 |

FIG. 4C

Table 2 (curing agent)

| Curing agent | | Active hydrogen concentration (mol/kg) | OH value mgKOH/g | Example 6 | Example 7 | Example 8 |
|---|---|---|---|---|---|---|
| Active hydrogen-containing compound (B1) | EXCENOL 837 | 0.50 | 28 | | | |
| Active hydrogen-containing compound (B2) | EXCENOL 450ED | 8.02 | 450 | 13.53 | 10.00 | 13.03 |
| Active hydrogen-containing compound (B3) | Adeka Polyether BM-34 | 14.74 | 827 | | 3.53 | |
| Active hydrogen-containing compound (B4) | Poly bd R15HT | 1.83 | 103 | 8.20 | 8.20 | 8.20 |
| Active hydrogen-containing compound (B5) | Poly bd R45HT | 0.83 | 47 | 18.45 | 18.45 | 18.45 |
| Active hydrogen-containing compound (B6) | EXCENOL 1020 | 2.00 | 112 | 12.30 | 12.30 | 12.30 |
| Active hydrogen-containing compound (B7) | HS 2N-226P | 0.94 | 53 | 7.38 | 7.38 | 7.38 |
| Active hydrogen-containing compound (B8) | JEFFAMINE D-400 | 9.30 | 522 | | | 0.50 |
| Comparative active hydrogen-containing compound | EXCENOL 450SN | 8.02 | 450 | | | |
| Water[*1] | | 111.1 | 6233 | 1.00 | 1.00 | 1.00 |
| Compound having skeleton derived from monoterpene (E2) | | | | 1.14 | 1.14 | 1.14 |
| Alkoxysilyl group- and/or silanol group-containing compound (D)[*3] | Compound (D-1-1) containing amino group and/or imino group | Solid content of D-1-1 (30%) | | 0.06 | 0.06 | 0.06 |
| | | Solvent of D-1-1 | Water[*4] | | | |
| | Compound (D-1-2) containing amino group and/or imino group | Solid content of D-1-2 (15%) | | 0.14 | 0.14 | 0.14 |
| | | Solvent: alcohol | | | | |
| | | Solvent of D-1-2 | Ethanol | | | |
| | | Solvent of D-1-2 | Methanol | | | |
| | Compound (D-1-3) N-2-(aminoethyl)-3-aminopropyltrimethoxysilane | | | | | |
| Filler 3 (calcium carbonate) | KALFINE 200 | | | 37.48 | 37.48 | 37.48 |
| Amine-based catalyst 4 | TEDA | | | 0.27 | 0.27 | 0.27 |
| Metal catalyst 4 | U-220H | | | 0.04 | 0.04 | 0.04 |
| Metal catalyst 2 | U-810 | | | 0.04 | 0.04 | 0.04 |

FIG. 4D

| Table 2 (curing agent) | Example 6 | Example 7 | Example 8 |
|---|---|---|---|
| Total of curing agent (parts by mass) | 100.0 | 100.0 | 100.0 |
| Average active hydrogen concentration (BH-c) of active hydrogen-containing compound (B) (mol/kg) | 2.85 | 3.24 | 2.86 |
| Average active hydrogen concentration (BWH-c) of active hydrogen-containing compound (B) and water (mol/kg) * The water herein represents the total of water*¹ and water*⁴ | 4.88 | 5.27 | 4.89 |
| Content of water (total of water*¹ and water*⁴) (%) | 1.14 | 1.14 | 1.14 |
| Content of alkoxysilyl group- or silanol group-containing compound (D)*³ (%) | 0.06 | 0.06 | 0.06 |
| Number of moles of active hydrogens of active hydrogen-containing compound (B) in 100 g of curing agent | 0.1704 | 0.1941 | 0.1710 |
| Number of total moles of (theoretical) active hydrogens of active hydrogen-containing compound (B) and (theoretical) active hydrogens of water in 100 g of curing agent * The water herein represents the total of water*¹ and water*⁴ | 0.2970 | 0.3207 | 0.2977 |
| Ratio of number of total moles of (theoretical) active hydrogens of water to number of total moles of active hydrogens of active hydrogen-containing compound (B) and (theoretical) active hydrogens of water in 100 g of curing agent (%) * The water herein represents the total of water*¹ and water*⁴ | 42.6 | 39.5 | 42.6 |
| Number of total moles of active hydrogens of active hydrogen-containing compounds (B2), (B3), and (B8) in 100 g of curing agent | 0.109 | 0.132 | 0.109 |
| Ratio of number of total moles of active hydrogens of active hydrogen-containing compounds (B2), (B3), and (B8) to number of total moles of active hydrogens of active hydrogen-containing compound (B) and (theoretical) active hydrogens of water in 100 g of curing agent (%) * The water herein represents the total of water*¹ and water*⁴ | 36.5 | 41.2 | 36.7 |

FIG. 4E

Table 2 (curing agent)

| Curing agent | | Active hydrogen concentration (mol/kg) | OH value mgKOH/g | Example 9 | Example 10 | Example 11 |
|---|---|---|---|---|---|---|
| Active hydrogen-containing compound (B1) | EXCENOL 837 | 0.50 | 28 | | | |
| Active hydrogen-containing compound (B2) | EXCENOL 450ED | 8.02 | 450 | 13.53 | 13.53 | 13.53 |
| Active hydrogen-containing compound (B3) | Adeka Polyether BM-34 | 14.74 | 827 | | | |
| Active hydrogen-containing compound (B4) | Poly bd R15HT | 1.83 | 103 | 8.20 | 8.20 | 8.20 |
| Active hydrogen-containing compound (B5) | Poly bd R45HT | 0.83 | 47 | 18.45 | 18.45 | 18.45 |
| Active hydrogen-containing compound (B6) | EXCENOL 1020 | 2.00 | 112 | 12.30 | 12.30 | 12.30 |
| Active hydrogen-containing compound (B7) | HS 2N-226P | 0.94 | 53 | 7.38 | 7.38 | 7.38 |
| Active hydrogen-containing compound (B8) | JEFFAMINE D-400 | 9.30 | 522 | | | |
| Comparative active hydrogen-containing compound | EXCENOL 450SN | 8.02 | 450 | | | |
| Water[*1] | | 111.1 | 6233 | 1.00 | 1.14 | 1.14 |
| Compound having skeleton derived from monoterpene (E2) | | | | 1.14 | 1.14 | |
| Alkoxysilyl group- and/or silanol group-containing compound (D)[*3] | Compound (D-1-1) containing amino group and/or imino group | Solid content of D-1-1 (30%) | | 0.06 | 0.08 | |
| | | Solvent of D-1-1 | Water[*4] | 0.14 | | |
| | Compound (D-1-2) containing amino group and/or imino group | Solid content of D-1-2 (15%) | | | | |
| | | Solvent of D-1-2 | Solvent: alcohol | | | |
| | | Solvent of D-1-2 | Ethanol | | 0.41 | |
| | | Solvent of D-1-2 | Methanol | | 0.03 | |
| | Compound (D-1-3) N-2-(aminoethyl)-3-aminopropyltrimethoxysilane | | | | | 0.10 |
| Filler 3 (calcium carbonate) | KALFINE 200 | | | 37.48 | 36.98 | 37.40 |
| Amine-based catalyst 4 | TEDA | | | 0.27 | 0.27 | 0.27 |
| Metal catalyst 4 | U-220H | | | 0.04 | 0.04 | 0.04 |
| Metal catalyst 2 | U-810 | | | 0.04 | 0.04 | 0.04 |

FIG. 4F

| Table 2 (curing agent) | Example 9 | Example 10 | Example 11 |
|---|---|---|---|
| Total of curing agent (parts by mass) | 100.0 | 100.0 | 100.0 |
| Average active hydrogen concentration (BH-c) of active hydrogen-containing compound (B) (mol/kg) | 2.85 | 2.85 | 2.85 |
| Average active hydrogen concentration (BWH-c) of active hydrogen-containing compound (B) and water (mol/kg) *The water herein represents the total of water*[1] and water*[4] | 4.88 | 4.87 | 4.87 |
| Content of water (total of water*[1] and water*[4]) (%) | 1.14 | 1.14 | 1.14 |
| Content of alkoxysilyl group- or silanol group-containing compound (D)*[3] (%) | 0.06 | 0.08 | 0.10 |
| Number of moles of active hydrogens of active hydrogen-containing compound (B) in 100 g of curing agent | 0.1704 | 0.1704 | 0.1704 |
| Number of total moles of active hydrogens of active hydrogen-containing compound (B) and (theoretical) active hydrogens of water in 100 g of curing agent *The water herein represents the total of water*[1] and water*[4] | 0.2970 | 0.2970 | 0.2970 |
| Ratio of number of (theoretical) active hydrogens of water to number of total moles of active hydrogens of active hydrogen-containing compound (B) and (theoretical) active hydrogens of water in 100 g of curing agent (%) *The water herein represents the total of water*[1] and water*[4] | 42.6 | 42.6 | 42.6 |
| Number of total moles of active hydrogens of active hydrogen-containing compounds (B2), (B3), and (B8) in 100 g of curing agent | 0.1085 | 0.109 | 0.109 |
| Ratio of number of total moles of active hydrogens of active hydrogen-containing compounds (B2), (B3), and (B8) to number of total moles of active hydrogens of active hydrogen-containing compound (B) and (theoretical) active hydrogens of water in 100 g of curing agent (%) *The water herein represents the total of water*[1] and water*[4] | 36.5 | 36.5 | 36.5 |

FIG. 4G

Table 2 (curing agent)

| Curing agent | | Active hydrogen concentration (mol/kg) | OH value mgKOH/g | Comparative Example 3 | Comparative Example 4 |
|---|---|---|---|---|---|
| Active hydrogen-containing compound (B1) | EXCENOL 837 | 0.50 | 28 | | |
| Active hydrogen-containing compound (B2) | EXCENOL 450ED | 8.02 | 450 | | 13.53 |
| Active hydrogen-containing compound (B3) | Adeka Polyether BM-34 | 14.74 | 827 | | |
| Active hydrogen-containing compound (B4) | Poly bd R15HT | 1.83 | 103 | | |
| Active hydrogen-containing compound (B5) | Poly bd R45HT | 0.83 | 47 | 8.20 | 8.20 |
| Active hydrogen-containing compound (B6) | EXCENOL 1020 | 2.00 | 112 | 18.45 | 18.45 |
| Active hydrogen-containing compound (B7) | HS 2N-226P | 0.94 | 53 | 12.30 | 12.30 |
| Active hydrogen-containing compound (B8) | JEFFAMINE D-400 | 9.30 | 522 | 7.38 | 7.38 |
| Comparative active hydrogen-containing compound | EXCENOL 450SN | 8.02 | 450 | 13.53 | |
| Water[1] | | 111.1 | 6233 | 1.00 | 0.00 |
| Compound having skeleton derived from monoterpene (E2) | | | | 1.14 | 1.14 |
| Alkoxysilyl group- and/or silanol group-containing compound (D)[3] | Compound (D-1-1) containing amino group and/or imino group | Solid content of D-1-1 (30%) | | 0.06 | 0.08 |
| | | Solvent of D-1-1 | Water[4] | 0.14 | |
| | Compound (D-1-2) containing amino group and/or imino group | Solid content of D-1-2 (15%) | | | |
| | | Solvent: alcohol | | | |
| | | Solvent of D-1-2 | Ethanol | | 0.41 |
| | | Solvent of D-1-2 | Methanol | | 0.03 |
| | Compound (D-1-3) N-2-(aminoethyl)-3-aminopropyltrimethoxysilane | | | | |
| Filler 3 (calcium carbonate) | KALFINE 200 | | | 37.48 | 38.12 |
| Amine-based catalyst 4 | TEDA | | | 0.27 | 0.27 |
| Metal catalyst 4 | U-220H | | | 0.04 | 0.04 |
| Metal catalyst 2 | U-810 | | | 0.04 | 0.04 |

FIG. 4H

| Table 2 (curing agent) | Comparative Example 3 | Comparative Example 4 |
|---|---|---|
| Total of curing agent (parts by mass) | 100.0 | 100.0 |
| Average active hydrogen concentration (BH-c) of active hydrogen-containing compound (B) (mol/kg) | 2.85 | 2.85 |
| Average active hydrogen concentration (BWH-c) of active hydrogen-containing compound (B) and water (mol/kg) | 4.88 | 2.85 |
| Content of water (total of water*1 and water*4) (%) * The water herein represents the total of water*1 and water*4 | 1.14 | 0.00 |
| Content of alkoxysilyl group- or silanol group-containing compound (D)*3 (%) | 0.06 | 0.08 |
| Number of moles of active hydrogens of active hydrogen-containing compound (B) in 100 g of curing agent | 0.1704 | 0.1704 |
| Number of total moles of (theoretical) active hydrogens of active hydrogen-containing compound (B) and (theoretical) active hydrogens of water in 100 g of curing agent * The water herein represents the total of water*1 and water*4 | 0.2970 | 0.1704 |
| Ratio of number of total moles of (theoretical) active hydrogens of water to number of total moles of active hydrogens of active hydrogen-containing compound (B) and (theoretical) active hydrogens of water in 100 g of curing agent (%) * The water herein represents the total of water*1 and water*4 | 42.6 | 0.0 |
| Number of total moles of active hydrogens of active hydrogen-containing compounds (B2), (B3), and (B8) in 100 g of curing agent | 0.000 | 0.109 |
| Ratio of number of total moles of active hydrogens of active hydrogen-containing compounds (B2), (B3), and (B8) to number of total moles of active hydrogens of active hydrogen-containing compound (B) and (theoretical) active hydrogens of water in 100 g of curing agent (%) * The water herein represents the total of water*1 and water*4 | 0.0 | 63.7 |

FIG. 41

| Table 2 - continuation (mixture of main agent and curing agent) | | Example 6 | Example 7 | Example 8 |
|---|---|---|---|---|
| Mixing ratio of main agent and curing agent | Main agent/curing agent = mixing ratio (mass ratio) | 10/1 | 10/1 | 10/1 |
| | Ratio R2 in mixture of main agent/curing agent (NCO/H) | 1.87 | 1.64 | 1.87 |
| | Ratio R3 in mixture of main agent/curing agent (NCO/H) (including all water) | 1.07 | 1.00 | 1.07 |

| Table 2 - continuation (evaluation result) | | Example 6 | Example 7 | Example 8 |
|---|---|---|---|---|
| Creep test 1 (with primer) (initial): 20°C65%RH; after 30 minutes | Substrate obtained by applying primer on surface-treated resin/ED sheet | Test temp. 20°C | A | A | A |
| Creep test 2 (with primer) (cured): 20°C65%RH; after 24 hours | Substrate obtained by applying primer on surface-treated resin/ED sheet | Test temp. 80°C | A | A | A |
| Creep test 3 (primerless) (initial): 20°C65%RH; after 30 minutes | Surface-treated resin substrate (primerless)/ED sheet | Test temp. 20°C | A | A | A |
| Creep test 4 (primerless) (cured): 20°C65%RH; after 24 hours | Surface-treated resin substrate (primerless)/ED sheet | Test temp. 80°C | A | A | A |
| Creep test 5 (Creep test 3 + Evaluating heaviness of a weight that fell after start of creep test) (primerless) (initial): 20°C65%RH; after 30 minutes | Surface-treated resin substrate (primerless)/ED sheet | Test temp. 20°C | B | B | C |
| Adhesion force (shear strength 1 week after curing at room temperature) | | 4.6MPa | 4.0MPa | 3.9MPa |

FIG. 4J

Table 2 (mixture of main agent and curing agent)

|  | Example 9 | Example 10 | Example 11 |
|---|---|---|---|
| Main agent/curing agent = mixing ratio (mass ratio) | 10/1 | 10/1 | 10/1 |
| Ratio R2 in mixture of main agent/curing agent (NCO/H) | 1.87 | 1.87 | 1.87 |
| Ratio R3 in mixture of main agent/curing agent (NCO/H) (including all water) | 1.07 | 1.07 | 1.07 |

Table 2 - continuation (evaluation result)

|  |  | Example 9 | Example 10 | Example 11 |
|---|---|---|---|---|
| Creep test 1 (with primer) (initial): 20°C65%RH; after 30 minutes | Substrate obtained by applying primer on surface-treated resin/ED sheet | Test temp. 20°C | A | A | A |
| Creep test 2 (with primer) (cured): 20°C65%RH; after 24 hours | Substrate obtained by applying primer on surface-treated resin/ED sheet | Test temp. 80°C | A | A | A |
| Creep test 3 (primerless) (initial): 20°C65%RH; after 30 minutes | Surface-treated resin substrate (primerless)/ED sheet | Test temp. 20°C | A | A | A |
| Creep test 4 (primerless) (cured): 20°C65%RH; after 24 hours | Surface-treated resin substrate (primerless)/ED sheet | Test temp. 80°C | A | A | A |
| Creep test 5 (Creep test 3 + Evaluating heaviness of a weight that fell after start of creep test) (primerless) (initial): 20°C65%RH; after 30 minutes | Surface-treated resin substrate (primerless)/ED sheet | Test temp. 20°C | B | B | C |
| Adhesion force (shear strength 1 week after curing at room temperature) |  |  | 3.6MPa | 4.4MPa | 3.8MPa |

FIG. 4K

Table 2 (mixture of main agent and curing agent)

| | | Comparative Example 3 | Comparative Example 4 |
|---|---|---|---|
| Mixing ratio of main agent and curing agent | Main agent/curing agent = mixing ratio (mass ratio) | 10/1 | 10/1 |
| | Ratio R2 in mixture of main agent/curing agent (NCO/H) | 1.87 | 1.87 |
| | Ratio R3 in mixture of main agent/curing agent (NCO/H) (including all water) | 1.07 | 1.87 |

Table 2 - continuation (evaluation result)

| | | | Comparative Example 3 | Comparative Example 4 |
|---|---|---|---|---|
| Creep test 1 (with primer) (initial): 20°C65%RH; after 30 minutes | Substrate obtained by applying primer on surface-treated resin/ED sheet | Test temp. 20°C | B | B |
| Creep test 2 (with primer) (cured): 20°C65%RH; after 24 hours | Substrate obtained by applying primer on surface-treated resin/ED sheet | Test temp. 80°C | B | B |
| Creep test 3 (primerless) (initial): 20°C65%RH; after 30 minutes | Surface-treated resin substrate (primerless)/ED sheet | Test temp. 20°C | C | D |
| Creep test 4 (primerless) (cured): 20°C65%RH; after 24 hours | Surface-treated resin substrate (primerless)/ED sheet | Test temp. 80°C | C | B |
| Creep test 5 (Creep test 3 + Evaluating heaviness of a weight that fell after start of creep test) (primerless) (initial): 20°C65%RH; after 30 minutes | Surface-treated resin substrate (primerless)/ED sheet | Test temp. 20°C | D | E |
| Adhesion force (shear strength 1 week after curing at room temperature) | | | 2.7MPa | 2.3MPa |

FIG. 4L

| Table 3 (main agent) | | | Ratio R1 | (NCO/H) | NCO% | Example 12 | Comparative Example 5 | Example 13 | Comparative Example 6 |
|---|---|---|---|---|---|---|---|---|---|
| Main agent | Polyisocyanate component (A) | Polyisocyanate component (A1) | 1.68 | | 1.80 | | | | |
| | | Polyisocyanate component (A2) | 8.00 | | 11.73 | 34.80 | 34.80 | 33.66 | 33.66 |
| | Plasticizer | DINP | — | | — | 25.11 | 25.11 | 23.93 | 23.93 |
| | Aliphatic diisocyanate derivative (C) | D-376N | — | | 23.6 | | | 2.31 | 2.31 |
| | Silane coupling agent (F-2-1) | X-12-1056ES | | | | | | 0.05 | 0.05 |
| | Silane coupling agent (F-1-1) | Adduct of biuret of HDI and 3-(N-phenyl)aminopropyltrimethoxysilane | | | 10.55 | | | 0.75 | 0.75 |
| | Silane coupling agent (F-1-2) | Adduct of isocyanurate of HDI and 3-(N-phenyl)aminopropyltrimethoxysilane | | | 10.36 | | | | |
| | Compound having skeleton derived from monoterpene (E1) | | | | | | | 0.50 | 0.50 |
| | Filler | Filler 1 (carbon) | #200 | | | 20.61 | 20.61 | 19.93 | 19.93 |
| | | Filler 2 (calcium carbonate) | Super S | | | 19.31 | 19.31 | 18.68 | 18.68 |
| | Metal catalyst | Metal catalyst 1 | U-600 | | | 0.004 | 0.004 | 0.004 | 0.004 |
| | | Metal catalyst 2 | DOTL (U-810) | | | | | | |
| | Amine-based catalyst | Amine-based catalyst 1 | X-DM | | | 0.071 | 0.071 | 0.068 | 0.068 |
| | | Amine-based catalyst 2 | BL-19 | | | | | | |
| | | Amine-based catalyst 3 | DMDEE | | | 0.109 | 0.109 | 0.101 | 0.101 |
| Total of main agent (parts by mass) | | | | | | 100.0 | 100.0 | 100.0 | 100.0 |
| Number of moles of NCO derived from polyisocyanate component (A) in 100 g of main agent | | | | | | 0.0972 | 0.0972 | 0.0940 | 0.0940 |
| Number of moles of NCO derived from aliphatic isocyanate (C) and silane coupling agent (F)*2 in 100 g of main agent | | | | | | | | 0.0149 | 0.0149 |
| Number of moles of NCO in 100 g of main agent (in total) | | | | | | 0.0972 | 0.0972 | 0.1089 | 0.1089 |
| Content of aliphatic diisocyanate derivative (C) (%) | | | | | | | | 2.31 | 2.31 |
| Content of silane coupling agent (F)*2 (%) | | | | | | | | 0.80 | 0.80 |

FIG. 5A

Table 3 (main agent)

| Main agent | | Ratio R1 (NCO/H) | NCO% | Example 14 | Comparative Example 7 | Comparative Example 8 |
|---|---|---|---|---|---|---|
| Polyisocyanate component (A) | Polyisocyanate component (A1) | 1.68 | 1.80 | | | |
| | Polyisocyanate component (A2) | 8.00 | 11.73 | 33.40 | 33.40 | 33.40 |
| Plasticizer | DINP | — | — | 22.97 | 22.97 | 22.97 |
| Aliphatic diisocyanate derivative (C) | D-376N | — | 23.6 | 1.97 | 1.97 | 1.97 |
| Silane coupling agent (F)² | Silane coupling agent (F-2-1) | X-12-1056ES | | | | |
| | Silane coupling agent (F-1-1) | Adduct of biuret of HDI and 3-(N-phenyl)aminopropyltrimethoxysilane | 10.55 | 2.60 | 2.60 | 2.60 |
| | Silane coupling agent (F-1-2) | Adduct of isocyanurate of HDI and 3-(N-phenyl)aminopropyltrimethoxysilane | 10.36 | | | |
| Compound having skeleton derived from monoterpene (E1) | | | | 0.48 | 0.48 | 0.48 |
| Filler | Filler 1 (carbon) | #200 | | 19.77 | 19.77 | 19.77 |
| | Filler 2 (calcium carbonate) | Super S | | 18.54 | 18.54 | 18.54 |
| Metal catalyst | Metal catalyst 1 | U-600 | | | | |
| | Metal catalyst 2 | DOTL (U-810) | | 0.004 | 0.004 | 0.004 |
| Amine-based catalyst | Amine-based catalyst 1 | X-DM | | 0.26 | 0.26 | 0.26 |
| | Amine-based catalyst 2 | BL-19 | | 0.01 | 0.01 | 0.01 |
| | Amine-based catalyst 3 | DMDEE | | | | |
| Total of main agent (parts by mass) | | | | 100.0 | 100.0 | 100.0 |
| Number of moles of NCO derived from polyisocyanate component (A) in 100 g of main agent | | | | 0.0933 | 0.0933 | 0.0933 |
| Number of moles of NCO derived from aliphatic isocyanate (C) and silane coupling agent (F)² in 100 g of main agent | | | | 0.0176 | 0.0176 | 0.0176 |
| Number of moles of NCO in 100 g of main agent (in total) | | | | 0.1109 | 0.1109 | 0.1109 |
| Content of aliphatic diisocyanate derivative (C) (%) | | | | 1.97 | 1.97 | 1.97 |
| Content of silane coupling agent (F)² (%) | | | | 2.60 | 2.60 | 2.60 |

FIG. 5B

Table 3 (main agent)

| Main agent | | Ratio R1 (NCO/H) | NCO% | Comparative Example 11 | Comparative Example 9 | Comparative Example 10 |
|---|---|---|---|---|---|---|
| Polyisocyanate component (A) | Polyisocyanate component (A1) | 1.68 | 1.80 | | 33.66 | 33.40 |
| | Polyisocyanate component (A2) | 8.00 | 11.73 | 33.40 | | |
| Plasticizer | DINP | | | 22.97 | 23.93 | 22.97 |
| Aliphatic diisocyanate derivative (C) | D-376N | | 23.6 | 1.97 | 2.31 | 1.97 |
| Silane coupling agent (F)[2] | Silane coupling agent (F-2-1) | X-12-1056ES | | | 0.05 | |
| | Silane coupling agent (F-1-1) | Adduct of biuret of HDI and 3-(N-phenyl)aminopropyltrimethoxysilane | 10.55 | 2.60 | 0.75 | 2.60 |
| | Silane coupling agent (F-1-2) | Adduct of isocyanurate of HDI and 3-(N-phenyl)aminopropyltrimethoxysilane | 10.36 | | | |
| Compound having skeleton derived from monoterpene (E1) | | | | 0.48 | 0.50 | 0.48 |
| Filler | Filler 1 (carbon) | #200 | | 19.77 | 19.93 | 19.77 |
| | Filler 2 (calcium carbonate) | Super S | | 18.54 | 18.68 | 18.54 |
| Metal catalyst | Metal catalyst 1 | U-600 | | | | |
| | Metal catalyst 2 | DOTL (U-810) | | 0.004 | 0.004 | 0.004 |
| Amine-based catalyst | Amine-based catalyst 1 | X-DM | | 0.26 | 0.068 | 0.26 |
| | Amine-based catalyst 2 | BL-19 | | 0.01 | | 0.01 |
| | Amine-based catalyst 3 | DMDEE | | | 0.101 | |
| Total of main agent (parts by mass) | | | | 100.0 | 100.0 | 100.0 |
| Number of moles of NCO derived from polyisocyanate component (A) in 100 g of main agent | | | | 0.0933 | 0.0144 | 0.0143 |
| Number of moles of NCO derived from aliphatic isocyanate (C) and silane coupling agent (F)[2] in 100 g of main agent | | | | 0.0176 | 0.0149 | 0.0176 |
| Number of moles of NCO in 100 g of main agent (in total) | | | | 0.1109 | 0.0293 | 0.0319 |
| Content of aliphatic diisocyanate derivative (C) (%) | | | | 1.97 | 2.31 | 1.97 |
| Content of silane coupling agent (F)[2] (%) | | | | 2.60 | 0.80 | 2.60 |

FIG. 5C

Table 3 (curing agent)

| Curing agent | | Active hydrogen concentration (mol/kg) | OH value mgKOH/g | Example 12 | Comparative Example 5 | Example 13 | Comparative Example 6 |
|---|---|---|---|---|---|---|---|
| Active hydrogen-containing compound (B1) | EXCENOL 837 | 0.50 | 28 | 59.39 | 59.39 | 57.61 | 57.61 |
| Active hydrogen-containing compound (B2) | EXCENOL 450ED | 8.02 | 450 | 2.64 | 2.64 | 2.57 | 2.57 |
| Active hydrogen-containing compound (B3) | Adeka Polyether BM-34 | 14.74 | 827 | | | 4.00 | 4.00 |
| Active hydrogen-containing compound (B4) | Poly bd R15HT | 1.83 | 103 | | | | |
| Active hydrogen-containing compound (B5) | Poly bd R45HT | 0.83 | 47 | | | | |
| Active hydrogen-containing compound (B6) | EXCENOL 1020 | 2.00 | 112 | | | | |
| Active hydrogen-containing compound (B7) | HS 2N-226P | 0.94 | 53 | | | | |
| Active hydrogen-containing compound (B8) | JEFFAMINE D-400 | 9.30 | 522 | 0.50 | 0.50 | 0.50 | 0.50 |
| Comparative active hydrogen-containing compound | EXCENOL 450SN | 8.02 | 450 | | | | |
| Water*1 | | 111.1 | 6233 | 1.32 | 0.00 | 1.28 | 0.00 |
| Compound having skeleton derived from monoterpene (E2) | | | | | | 0.50 | 0.50 |
| Alkoxysilyl group- and/or silanol group-containing compound (D)*3 | Compound (D-1-1) containing amino group and/or imino group | Solid content of D-1-1 (30%) | | | | 0.08 | 0.08 |
| | | Solvent of D-1-1 | Water*4 Solvent: alcohol | | | 0.41 | 0.41 |
| | Compound (D-1-2) containing amino group and/or imino group | Solid content of D-1-2 (15%) | | | | 0.03 | 0.03 |
| | | Solvent of D-1-2 | Ethanol | | | | |
| | | Solvent of D-1-2 | Methanol | | | | |
| | Compound (D-1-3) N-2-(aminoethyl)-3-aminopropyltrimethoxysilane | | | | | | |
| Filler 3 (calcium carbonate) | KALFINE 200 | | | 35.80 | 37.12 | 32.40 | 33.68 |
| Amine-based catalyst 4 | TEDA | | | 0.27 | 0.27 | 0.50 | 0.50 |
| Metal catalyst 4 | U-220H | | | 0.04 | 0.04 | 0.04 | 0.04 |
| Metal catalyst 2 | U-810 | | | 0.04 | 0.04 | 0.04 | 0.04 |

FIG. 5D

| Table 3 (curing agent) | Example 12 | Comparative Example 5 | Example 13 | Comparative Example 6 |
|---|---|---|---|---|
| Total of curing agent (parts by mass) | 100.0 | 100.0 | 100.0 | 100.0 |
| Average active hydrogen concentration (BH-c) of active hydrogen-containing compound (B) (mol/kg) | 0.89 | 0.89 | 1.75 | 1.75 |
| Average active hydrogen concentration (BWH-c) of active hydrogen-containing compound (B) and water (mol/kg) * The water herein represents the total of water*1 and water*4 | 3.17 | 0.89 | 3.87 | 1.75 |
| Content of water (total of water*1 and water*4) (%) | 1.32 | 0.00 | 1.28 | 0.00 |
| Content of alkoxysilyl group- or silanol group-containing compound (D)*3 (%) | 0.00 | 0.00 | 0.08 | 0.08 |
| Number of moles of active hydrogens of active hydrogen-containing compound (B) in 100 g of curing agent | 0.0555 | 0.0555 | 0.1130 | 0.1130 |
| Number of total moles of (theoretical) active hydrogens of active hydrogen-containing compound (B) and (theoretical) active hydrogens of water in 100 g of curing agent * The water herein represents the total of water*1 and water*4 | 0.2021 | 0.0555 | 0.2552 | 0.1130 |
| Ratio of number of total moles of (theoretical) active hydrogens of water to number of total moles of active hydrogens of active hydrogen-containing compound (B) and (theoretical) active hydrogens of water in 100 g of curing agent (%) * The water herein represents the total of water*1 and water*4 | 72.6 | 0.0 | 55.7 | 0.0 |
| Number of total moles of active hydrogens of active hydrogen-containing compounds (B2), (B3), and (B8) in 100 g of curing agent | 0.026 | 0.026 | 0.084 | 0.084 |
| Ratio of number of total moles of active hydrogens of active hydrogen-containing compounds (B2), (B3), and (B8) to number of total moles of active hydrogens of active hydrogen-containing compound (B) and (theoretical) active hydrogens of water in 100 g of curing agent (%) * The water herein represents the total of water*1 and water*4 | 12.8 | 46.6 | 33.0 | 74.6 |

FIG. 5E

Table 3 (curing agent)

| Curing agent | | Active hydrogen concentration (mol/kg) | OH value mgKOH/g | Example 14 | Comparative Example 7 | Comparative Example 8 |
|---|---|---|---|---|---|---|
| Active hydrogen-containing compound (B1) | EXCENOL 837 | 0.50 | 28 | | | |
| Active hydrogen-containing compound (B2) | EXCENOL 450ED | 8.02 | 450 | | 13.53 | |
| Active hydrogen-containing compound (B3) | Adeka Polyether BM-34 | 14.74 | 827 | 13.53 | | |
| Active hydrogen-containing compound (B4) | Poly bd R15HT | 1.83 | 103 | 8.20 | 8.20 | 8.20 |
| Active hydrogen-containing compound (B5) | Poly bd R45HT | 0.83 | 47 | 18.45 | 18.45 | 18.45 |
| Active hydrogen-containing compound (B6) | EXCENOL 1020 | 2.00 | 112 | 12.30 | 12.30 | 12.30 |
| Active hydrogen-containing compound (B7) | HS 2N-226P | 0.94 | 53 | 7.38 | 7.38 | 7.38 |
| Active hydrogen-containing compound (B8) | JEFFAMINE D-400 | 9.30 | 522 | 0.50 | 0.50 | 0.00 |
| Comparative active hydrogen-containing compound | EXCENOL 450SN | 8.02 | 450 | | | 13.53 |
| Water[1] | | 111.1 | 6233 | 1.00 | 0.00 | 1.14 |
| Compound having skeleton derived from monoterpene (E2) | | | | 1.14 | 1.14 | |
| Alkoxysilyl group- and/or silanol group-containing compound (D)[3] | Compound (D-1-1) containing amino group and/or imino group | Solid content of D-1-1 (30%) | | 0.06 | | |
| | | Solvent of D-1-1 | Water[4] | 0.14 | | |
| | Compound (D-1-2) containing amino group and/or imino group | Solid content of D-1-2 (15%) Solvent: alcohol | | | | 0.08 |
| | | Solvent of D-1-2 | Ethanol | | | 0.41 |
| | | Solvent of D-1-2 | Methanol | | | 0.03 |
| | Compound (D-1-3) N-2-(aminoethyl)-3-aminopropyltrimethoxysilane | | | | | |
| Filler 3 (calcium carbonate) | KALFINE 200 | | | 36.98 | 38.18 | 36.98 |
| Amine-based catalyst 4 | TEDA | | | 0.27 | 0.27 | 0.27 |
| Metal catalyst 4 | U-220H | | | 0.04 | 0.04 | 0.04 |
| Metal catalyst 2 | U-810 | | | 0.04 | 0.04 | 0.04 |

FIG. 5F

| Table 3 (curing agent) | Example 14 | Comparative Example 7 | Comparative Example 8 |
|---|---|---|---|
| Total of curing agent (parts by mass) | 100.0 | 100.0 | 100.0 |
| Average active hydrogen concentration (BH-c) of active hydrogen-containing compound (B) (mol/kg) | 2.90 | 2.90 | 2.85 |
| Average active hydrogen concentration (BWH-c) of active hydrogen-containing compound (B) and water (mol/kg) *The water herein represents the total of water*1 and water*4 | 4.92 | 2.90 | 4.87 |
| Content of water (total of water*1 and water*4) (%) | 1.14 | 0.00 | 1.14 |
| Content of alkoxysilyl group- or silanol group-containing compound (D)*3 (%) | 0.06 | 0.00 | 0.08 |
| Number of moles of active hydrogens of active hydrogen-containing compound (B) in 100 g of curing agent | 0.1750 | 0.1750 | 0.1704 |
| Number of total moles of active hydrogens of active hydrogen-containing compound (B) and (theoretical) active hydrogens of water in 100 g of curing agent *The water herein represents the total of water*1 and water*4 | 0.3017 | 0.1750 | 0.2970 |
| Ratio of number of moles of (theoretical) active hydrogens of water to number of total moles of active hydrogens of active hydrogen-containing compound (B) and (theoretical) active hydrogens of water in 100 g of curing agent (%) *The water herein represents the total of water*1 and water*4 | 42.0 | 0.0 | 42.6 |
| Number of total moles of active hydrogens of active hydrogen-containing compounds (B2), (B3), and (B8) in 100 g of curing agent | 0.113 | 0.113 | 0.000 |
| Ratio of number of total moles of active hydrogens of active hydrogen-containing compounds (B2), (B3), and (B8) to number of total moles of active hydrogens of active hydrogen-containing compound (B) and (theoretical) active hydrogens of water in 100 g of curing agent (%) *The water herein represents the total of water*1 and water*4 | 37.5 | 64.7 | 0.0 |

FIG. 5G

Table 3 (curing agent)

| Curing agent | | Active hydrogen concentration (mol/kg) | OH value mgKOH/g | Comparative Example 11 | Comparative Example 9 | Comparative Example 10 |
|---|---|---|---|---|---|---|
| Active hydrogen-containing compound (B1) | EXCENOL 837 | 0.50 | 28 | | 57.61 | |
| Active hydrogen-containing compound (B2) | EXCENOL 450ED | 8.02 | 450 | | | |
| Active hydrogen-containing compound (B3) | Adeka Polyether BM-34 | 14.74 | 827 | | | |
| Active hydrogen-containing compound (B4) | Poly bd R15HT | 1.83 | 103 | | | |
| Active hydrogen-containing compound (B5) | Poly bd R45HT | 0.83 | 47 | 8.20 | | 8.20 |
| Active hydrogen-containing compound (B6) | EXCENOL 1020 | 2.00 | 112 | 18.45 | | 18.45 |
| Active hydrogen-containing compound (B7) | HS 2N-226P | 0.94 | 53 | 12.30 | | 12.30 |
| Active hydrogen-containing compound (B8) | JEFFAMINE D-400 | 9.30 | 522 | 7.38 | | 7.38 |
| Comparative active hydrogen-containing compound | EXCENOL 450SN | 8.02 | 450 | 0.00 | | |
| Water*1 | | 111.1 | 6233 | 13.53 | 1.00 | |
| Compound having skeleton derived from monoterpene (E2) | | | | 0.25 | 1.28 | 1.14 |
| Compound (D-1-1) containing amino group and/or imino group | Solid content of D-1-1 (30%) | | | 1.14 | 0.50 | |
| | Water*4 | | | | | 0.06 |
| Compound (D-1-2) containing amino group and/or imino group | Solid content of D-1-2 (15%) | | | | | 0.14 |
| | Solvent: alcohol | | | | | |
| | Solvent of D-1-2 Ethanol | | | 0.08 | 0.08 | |
| | Solvent of D-1-2 Methanol | | | 0.41 | 0.41 | |
| Compound (D-1-3) N-2-(aminoethyl)-3-aminopropyltrimethoxysilane | | | | 0.03 | 0.03 | |
| Filler 3 (calcium carbonate) | KALFINE 200 | | | 37.88 | 39.50 | 50.98 |
| Amine-based catalyst 4 | TEDA | | | 0.27 | 0.50 | 0.27 |
| Metal catalyst 4 | U-220H | | | 0.04 | 0.04 | 0.04 |
| Metal catalyst 2 | U-810 | | | 0.04 | 0.04 | 0.04 |

FIG. 5H

| Table 3 (curing agent) | Comparative Example 11 | Comparative Example 9 | Comparative Example 10 |
|---|---|---|---|
| Total of curing agent (parts by mass) | 100.0 | 100.0 | 100.0 |
| Average active hydrogen concentration (BH-c) of active hydrogen-containing compound (B) (mol/kg) | 2.85 | 0.50 | 1.33 |
| Average active hydrogen concentration (BWH-c) of active hydrogen-containing compound (B) and water (mol/kg) *The water herein represents the total of water*1 and water*4 | 3.30 | 2.90 | 3.98 |
| Content of water (total of water*1 and water*4) (%) | 0.25 | 1.28 | 1.14 |
| Content of alkoxysilyl group- or silanol group-containing compound (D)*3 (%) | 0.08 | 0.08 | 0.06 |
| Number of moles of active hydrogens of active hydrogen-containing compound (B) in 100 g of curing agent | 0.1704 | 0.0288 | 0.0618 |
| Number of total moles of active hydrogens of active hydrogen-containing compound (B) and (theoretical) active hydrogens of water in 100 g of curing agent *The water herein represents the total of water*1 and water*4 | 0.1981 | 0.1710 | 0.1885 |
| Ratio of number of moles of (theoretical) active hydrogens of water to number of total moles of active hydrogens of active hydrogen-containing compound (B) and (theoretical) active hydrogens of water in 100 g of curing agent (%) *The water herein represents the total of water*1 and water*4 | 14.0 | 83.2 | 67.2 |
| Number of total moles of active hydrogens of active hydrogen-containing compounds (B2), (B3), and (B8) in 100 g of curing agent | 0.000 | 0.000 | 0.000 |
| Ratio of number of total moles of active hydrogens of active hydrogen-containing compounds (B2), (B3), and (B8) to number of total moles of active hydrogens of active hydrogen-containing compound (B) and (theoretical) active hydrogens of water in 100 g of curing agent (%) *The water herein represents the total of water*1 and water*4 | 0.0 | 0.0 | 0.0 |

FIG. 51

| Table 3 (mixture of main agent and curing agent) | | Example 12 | Comparative Example 5 | Example 13 | Comparative Example 6 |
|---|---|---|---|---|---|
| Mixing ratio of main agent and curing agent | Main agent/curing agent = mixing ratio (mass ratio) | 10/4 | 10/4 | 10/3 | 10/3 |
| | Ratio R2 in mixture of main agent/curing agent (NCO/H) | 4.38 | 4.38 | 3.21 | 3.21 |
| | Ratio R3 in mixture of main agent/curing agent (NCO/H) (including all water) | 1.20 | 4.38 | 1.42 | 3.21 |
| Table 3 (evaluation result) | | Example 12 | Comparative Example 5 | Example 13 | Comparative Example 6 |
| Creep test 1 (with primer) (initial): 20°C65%RH; after 30 minutes | Substrate obtained by applying primer on surface-treated resin/ED sheet | Test temp. 20°C | B | D | B | B |
| Creep test 2 (with primer) (cured): 20°C65%RH; after 24 hours | Substrate obtained by applying primer on surface-treated resin/ED sheet | Test temp. 80°C | B | D | B | B |
| Creep test 3 (primerless) (initial): 20°C65%RH; after 30 minutes | Surface-treated resin substrate (primerless)/ED sheet | Test temp. 20°C | C | D | B | D |
| Creep test 4 (primerless) (cured): 20°C65%RH; after 24 hours | Surface-treated resin substrate (primerless)/ED sheet | Test temp. 80°C | B | D | B | C |
| Creep test 5 (Creep test 3 + Evaluating heaviness of a weight that fell after the start of creep test) (primerless) (initial): 20°C65%RH; after 30 minutes | Surface-treated resin substrate (primerless)/ED sheet | Test temp. 20°C | D | E | C | E |
| Adhesion force (shear strength 1 week after curing at room temperature) | | 3.0MPa | 2.4MPa | 3.1MPa | 2.2MPa |

| Table 3 (mixture of main agent and curing agent) | | Example 14 | Comparative Example 7 | Comparative Example 8 |
|---|---|---|---|---|
| Mixing ratio of main agent and curing agent | Main agent/curing agent = mixing ratio (mass ratio) | 10/2 | 10/2 | 10/2 |
| | Ratio R2 in mixture of main agent/curing agent (NCO/H) | 3.17 | 3.17 | 3.25 |
| | Ratio R3 in mixture of main agent/curing agent (NCO/H) (including all water) | 1.84 | 3.17 | 1.87 |

| Table 3 (evaluation result) | | | Example 14 | Comparative Example 7 | Comparative Example 8 |
|---|---|---|---|---|---|
| Creep test 1 (with primer) (initial): 20°C65%RH; after 30 minutes | Substrate obtained by applying primer on surface-treated resin/ED sheet | Test temp. 20°C | B | B | B |
| Creep test 2 (with primer) (cured): 20°C65%RH; after 24 hours | Substrate obtained by applying primer on surface-treated resin/ED sheet | Test temp. 80°C | A | B | B |
| Creep test 3 (primerless) (initial): 20°C65%RH; after 30 minutes | Surface-treated resin substrate (primerless)/ED sheet | Test temp. 20°C | B | D | C |
| Creep test 4 (primerless) (cured): 20°C65%RH; after 24 hours | Surface-treated resin substrate (primerless)/ED sheet | Test temp. 80°C | A | B | C |
| Creep test 5 (Creep test 3 + Evaluating heaviness of a weight that fell after start of creep test) (primerless) (initial): 20°C65%RH; after 30 minutes | Surface-treated resin substrate (primerless)/ED sheet | Test temp. 20°C | C | E | D |
| Adhesion force (shear strength 1 week after curing at room temperature) | | | 3.4MPa | 2.1MPa | 2.9MPa |

Table 3 (mixture of main agent and curing agent)

| | | | Comparative Example 10 | Comparative Example 9 | Comparative Example 11 |
|---|---|---|---|---|---|
| Mixing ratio of main agent and curing agent | Main agent/curing agent = mixing ratio (mass ratio) | | 10/1 | 10/1 | 10/2 |
| | Ratio R2 in mixture of main agent/curing agent (NCO/H) | | 5.16 | 10.19 | 3.25 |
| | Ratio R3 in mixture of main agent/curing agent (NCO/H) (including all water) | | 1.69 | 1.71 | 2.80 |

Table 3 (evaluation result)

| | | | Comparative Example 10 | Comparative Example 9 | Comparative Example 11 |
|---|---|---|---|---|---|
| Creep test 1 (with primer) (initial): 20°C65%RH; after 30 minutes | Substrate obtained by applying primer on surface-treated resin/ED sheet | Test temp. 20°C | D | D | B |
| Creep test 2 (with primer) (cured): 20°C65%RH; after 24 hours | Substrate obtained by applying primer on surface-treated resin/ED sheet | Test temp. 80°C | B | B | B |
| Creep test 3 (primerless) (initial): 20°C65%RH; after 30 minutes | Surface-treated resin substrate (primerless)/ED sheet | Test temp. 20°C | D | D | D |
| Creep test 4 (primerless) (cured): 20°C65%RH; after 24 hours | Surface-treated resin substrate (primerless)/ED sheet | Test temp. 80°C | B | B | C |
| Creep test 5 (Creep test 3 + Evaluating heaviness of a weight that fell after start of creep test) (primerless) (initial): 20°C65%RH; after 30 minutes | Surface-treated resin substrate (primerless)/ED sheet | Test temp. 20°C | E | E | E |
| Adhesion force (shear strength 1 week after curing at room temperature) | | | 4.0MPa | 3.2MPa | 2.1MPa |

FIG. 5L

TWO-PART URETHANE ADHESIVE COMPOSITION

RELATED APPLICATION

This application is based upon and claims the benefit of priority from Japanese Patent Application Nos. 2021-155673 filed on Sep. 24, 2021 and 2022-143610 filed on Sep. 9, 2022, the entire contents of each of which is incorporated herein by reference.

BACKGROUND

The present technology relates to a two-part urethane adhesive composition.

Conventionally, two-part urethane adhesive compositions have been used for, for example, automobiles (for example, Japan Patent No. 6621847 B).

In such circumstances, the present inventors prepared a two-part urethane adhesive composition by reference to Japan Patent No. 6621847 B and evaluated the composition. The result thereof revealed that the adhesion obtained from such a composition sometimes does not reach a currently required level.

SUMMARY

The present technology provides a two-part urethane adhesive composition having excellent adhesion.

The present inventors have made an intensive study and found that a desired effect can be achieved by the configuration in which, for instance, a main agent and a curing agent are included, the curing agent contains water and an active hydrogen-containing compound (B) having a plurality of active hydrogens, and an average active hydrogen concentration of the active hydrogen-containing compound (B) and water, and other parameters fall within specific ranges.

The present technology is based on the above findings and the like, and specifically, the object is achieved by the following characteristic features.

[1] A two-part urethane adhesive composition comprising:
 a main agent containing a polyisocyanate component (A); and
 a curing agent containing water and an active hydrogen-containing compound (B) having a plurality of active hydrogens,
 wherein the active hydrogen-containing compound (B) contains a nitrogen-containing compound represented by Formula
(4) which is described later,
 in the main agent, the polyisocyanate component (A) contains a urethane prepolymer (A-3) formed using an active hydrogen-containing compound (A-1) having a plurality of active hydrogens and an isocyanate compound (A-2) having two or more functionalities, and a ratio R1 of a number of isocyanate groups of the isocyanate compound (A-2) to a number of active hydrogens (A1-H) of the active hydrogen-containing compound (A-1) (NCO/H) is 1.5 to 10,
 in the curing agent, an average active hydrogen concentration (BH-c) of the active hydrogen-containing compound
(B) is 0.50 to 3.50 mol/kg, and an average active hydrogen concentration (BWH-c) of the active hydrogen-containing compound
(B) and the water is 2.00 to 8.00 mol/kg, and
 the main agent and the curing agent are mixed in such amounts as to satisfy conditions that a ratio R2 of a number of isocyanate groups of the polyisocyanate component (A) to a number of active hydrogens (B-H) of the active hydrogen-containing compound (B) (NCO/H) is 1 to 5, and a ratio R3 of a number of isocyanate groups of the polyisocyanate component (A) to a total number of active hydrogens of the active hydrogen-containing compound (B) and the water (NCO/H) is 0.5 to 2.5, provided that the active hydrogen-containing compound (B) has no silicon.

[2] The two-part urethane adhesive composition according to [1],
 wherein the urethane prepolymer (A-3) contains an unreacted isocyanate compound (A-2') having two or more functionalities.

[3] The two-part urethane adhesive composition according to [1] or [2],
 wherein the main agent further contains a silane coupling agent (F),
 the silane coupling agent (F) contains a silane coupling agent (F-1) and/or a monosulfide-containing silane coupling agent (F-2), the silane coupling agent (F-1) being obtained by reacting a modified product of aliphatic polyisocyanate and an amino silane coupling agent, and having a skeleton derived from the modified product and an isocyanate group.

[4] The two-part urethane adhesive composition according to [3],
 wherein the silane coupling agent (F) contains the silane coupling agent (F-1).

[5] The two-part urethane adhesive composition according to [3] or [4],
 wherein the modified product of aliphatic polyisocyanate contains a biuret of hexamethylene diisocyanate.

[6] The two-part urethane adhesive composition according to any one of [3] to [5],
 wherein the amino silane coupling agent has an $NH_2$ group or an NH group, and in the amino silane coupling agent, a number of $NH_2$ groups is zero or one per molecule of the amino silane coupling agent, and a total number of $NH_2$ groups and NH groups is one or more.

[7] The two-part urethane adhesive composition according to any one of [1] to [6],
 wherein the main agent further contains at least one aliphatic diisocyanate derivative (C) selected from the group consisting of isocyanurates, biurets, and allophanates of aliphatic diisocyanates, provided that the aliphatic diisocyanate derivative (C) has no silicon, and a content of the aliphatic diisocyanate derivative (C) is 0.1 to 10 mass % of a total amount of the main agent.

[8] The two-part urethane adhesive composition according to any one of [1] to [7],
 wherein the curing agent contains at least one selected from the group consisting of:
 a nitrogen-containing compound 1 represented by Formula (4), where $R_6$ to $R_9$ each independently represent a propylene group and/or an ethylene group, $R_{10}$ represents an alkylene group with 2 to 10 carbon atoms, a to d each independently represent 1 to 10, and at least one of a to d is 3 or more;
 a nitrogen-containing compound 2 represented by Formula (5) which is described later; and a nitrogen-containing compound 3 represented by Formula (4), where $R_6$ to $R_9$ each independently represent an alkylene group, $R_{10}$ represents a polyoxyalkylene group, and a to d each represent 0.

[9] The two-part urethane adhesive composition according to [8],
wherein the curing agent contains the nitrogen-containing compound 1, and further contains the nitrogen-containing compound 2 and/or the nitrogen-containing compound 3.

[10] The two-part urethane adhesive composition according to any one of [1] to [9],
wherein the curing agent further contains a compound (D) having an alkoxysilyl group and/or a silanol group, and a content of the compound (D) in the curing agent is 0.002 to 5 mass % of a total amount of the composition.

[11] The two-part urethane adhesive composition according to [10],
wherein the compound (D) contains an amino silane coupling agent having a plurality of amino groups.

[12] The two-part urethane adhesive composition according to [11],
wherein the amino silane coupling agent having a plurality of amino groups has an organic chain or a siloxane skeleton as its skeleton.

A two-part urethane adhesive composition of the technology has excellent adhesive properties.

BRIEF DESCRIPTION OF THE DRAWINGS

FIGS. 3A-5L include Tables 1-3 showing results of inventive and comparative Examples.

DETAILED DESCRIPTION

Figure 1:
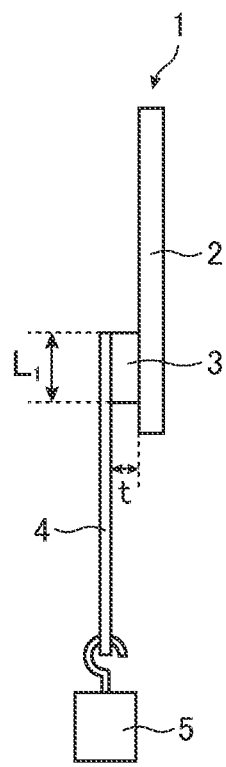
FIG. 1 is a schematic side view showing a creep test conducted in Examples of the technology.

The present technology is described below in detail.

In the present specification, a numerical range expressed in the form of "A to B" is intended to mean the range including the values A and B before and after "to".

In the present specification, for each component, substances corresponding to the component may be used singly or in combination of two or more, unless otherwise specified. When a certain component comprises two or more substances, the content of the component is intended to mean the total content of the two or more substances.

In the present specification, having more excellent adhesion is sometimes expressed as a more excellent effect of the technology.

In the present specification, a polyisocyanate component (A) is sometimes simply referred to as "(A)". The same applies to other components.

[Two-Part Urethane Adhesive Composition]

A two-part urethane adhesive composition of the technology (an adhesive composition of the technology) comprises:
a main agent containing a polyisocyanate component (A); and
a curing agent containing water and an active hydrogen-containing compound (B) having a plurality of active hydrogens,
wherein the active hydrogen-containing compound (B) contains a nitrogen-containing compound represented by Formula (4), in the main agent, the polyisocyanate component (A) contains a urethane prepolymer (A-3) formed using an active hydrogen-containing compound (A-1) having a plurality of active hydrogens and an isocyanate compound (A-2) having two or more functionalities, and a ratio R1 of the number of isocyanate groups of the isocyanate compound (A-2) to the number of active hydrogens (A1-H) of the active hydrogen-containing compound (A-1) (NCO/H) is 1.5 to 10, in the curing agent, an average active hydrogen concentration (BH-c) of the active hydrogen-containing compound (B) is 0.50 to 3.50 mol/kg, and an average active hydrogen concentration (BWH-c) of the active hydrogen-containing compound (B) and the water is 2.00 to 8.00 mol/kg, and the main agent and the curing agent are mixed in such amounts as to satisfy conditions that a ratio R2 of the number of isocyanate groups of the polyisocyanate component (A) to the number of active hydrogens (B-H) of the active hydrogen-containing compound (B) (NCO/H) is 1 to 5, and a ratio R3 of the number of isocyanate groups of the polyisocyanate component (A) to the total number of active hydrogens of the active hydrogen-containing compound (B) and the water (NCO/H) is 0.5 to 2.5, provided that the active hydrogen-containing compound (B) has no silicon.

The components contained in the adhesive composition of the technology is described below in detail.

The adhesive composition of the technology is a two-part urethane adhesive composition including a main agent and a curing agent (curing agent in a broad sense).

[Main Agent]

In the present technology, the main agent contains a polyisocyanate component (A).

[Polyisocyanate Component (A)]

In the present technology, the polyisocyanate component (A) in the main agent contains a urethane prepolymer (A-3) formed using an active hydrogen-containing compound (A-1) having a plurality of active hydrogens and an isocyanate compound (A-2) having two or more functionalities.

[Urethane Prepolymer (A-3)]

In the present technology, the urethane prepolymer (A-3) preferably has plural isocyanate groups. The (A-3) preferably has an isocyanate group at its end.

[Active Hydrogen-Containing Compound (A-1)]

In the present technology, the active hydrogen-containing compound (A-1) having a plurality of active hydrogens that is used in formation of the urethane prepolymer (A-3) is a compound having two or more active hydrogens per molecule.

[Active Hydrogen (A1-H)]

Active hydrogens (A1-H) of the (A-1) may form a functional group such as a hydroxy group, an amino group, an imino group, a mercapto group, or a carboxy group.

Active hydrogens (A1-H) of the (A-1) preferably form a hydroxy group because this leads to a more excellent effect of the technology.

The (A-1) preferably has two or three active hydrogens (A1-H) per molecule because this leads to a more excellent effect of the technology.

Main Chain Skeleton of (A-1)

The main chain skeleton of the (A-1) is not particularly limited. Examples thereof include hydrocarbon, polyether, polyester, and combinations thereof.

Specific Examples of (A-1)

Examples of the (A-1) include polyether polyol, polyester polyol, and polyamine.

The (A-1) preferably contains polyether polyol because this leads to a more excellent effect of the technology.

Exemplary polyether polyols include polyoxyethylene polyol, polyoxypropylene polyol, and polyoxyethylene polyoxypropylene polyol.

[Isocyanate Compound (A-2)]

The isocyanate compound (A-2) having two or more functionalities that is used in formation of the urethane prepolymer (A-3) in the polyisocyanate component (A) is a compound having plural (two or more) isocyanate groups per molecule.

[Isocyanate Group]

The (A-2) preferably has two or three isocyanate groups per molecule because this leads to a more excellent effect of the technology.

Main Chain Skeleton of (A-2)

The main chain skeleton of the (A-2) is not particularly limited. Examples thereof include hydrocarbon groups such as an aliphatic hydrocarbon group, an aromatic hydrocarbon group, and a combination thereof.

Specific Examples of (A-2)

Examples of the (A-2) include: aromatic polyisocyanates such as toluene diisocyanate (TDI), diphenylmethane diisocyanate (unsubstituted MDI; also called pure MDI or monomeric MDI), 1,4-phenylene diisocyanate, xylylene diisocyanate (XDI), tetramethyl xylylene diisocyanate (TMXDI), tolidine diisocyanate (TODI), 1,5-naphthalene diisocyanate (NDI), triphenylmethane triisocyanate, polymeric MDI (a compound obtained by polymerizing diphenylmethane diisocyanate (pure MDI)), and modified MDI; and aliphatic polyisocyanates such as pentamethylene diisocyanate (PDI), hexamethylene diisocyanate (HDI), trimethyl hexamethylene diisocyanate (TMHDI), lysine diisocyanate, norbornane diisocyanate (NBDI), trans-cyclohexane-1,4-diisocyanate, isophorone diisocyanate (IPDI), bis(isocyanatomethyl)cyclohexane ($H_6$XDI), and dicyclohexylmethane diisocyanate ($H_{12}$MDI).

An aliphatic hydrocarbon group in aliphatic polyisocyanate (a compound in which plural isocyanate groups are bonded to aliphatic hydrocarbon) may have, for instance, a linear, branched or cyclic form or a form of combination thereof.

The (A-2) preferably contains aromatic polyisocyanate (a compound in which plural isocyanate groups are bonded to aromatic hydrocarbon) and more preferably contains diphenylmethane diisocyanate.

[Ratio R1 (NCO/H)]

In the present technology, the ratio R1 of the number of isocyanate groups of the (A-2) to the number of active hydrogens (A1-H) of the (A-1) (NCO/H) is 1.5 to 10.

The ratio R1 (NCO/H) is preferably 1.6 to 8.5 and more preferably 1.6 to 7.0 because this leads to a more excellent effect of the technology.

(Isocyanate Compound (A-2'))

The ratio R1 (NCO/H) in the technology is 1.5 to 10 as described above, and since isocyanate groups are excessive relative to active hydrogens (A1-H) in the polyisocyanate component (A), the urethane prepolymer (A-3) may contain an unreacted isocyanate compound (A-2') having two or more functionalities in addition to a urethane prepolymer that is a reaction product.

The urethane prepolymer (A-3) preferably contains the unreacted isocyanate compound (A-2') having two or more functionalities because this leads to a more excellent effect of the technology.

(Aliphatic Diisocyanate Derivative (C))

The main agent preferably further contains at least one aliphatic diisocyanate derivative (C) selected from the group consisting of isocyanurates, biurets, and allophanates of aliphatic diisocyanates because this leads to a more excellent effect of the technology. However, the aliphatic diisocyanate derivative (C) has no silicon. This proviso is given to exclude a silane coupling agent (F) and a compound (D), which will be described later, from the (C).

An aliphatic hydrocarbon group in aliphatic diisocyanate (a compound in which two isocyanate groups are bonded to aliphatic hydrocarbon) may have, for instance, a linear, branched or cyclic form or a form of combination thereof.

For the aliphatic diisocyanate forming the aliphatic diisocyanate derivative (C), aliphatic polyisocyanates listed as examples of the (A-2) are applicable, for instance.

The aliphatic diisocyanate derivative (C) preferably contains an isocyanurate of pentamethylene diisocyanate and/or an allophanate of pentamethylene diisocyanate, and more preferably contains an isocyanurate of pentamethylene diisocyanate and an allophanate of pentamethylene diisocyanate, because this leads to a more excellent effect of the technology.

Content of Aliphatic Diisocyanate Derivative (C)

The aliphatic diisocyanate derivative (C) content is preferably 0.1 to 10 mass % and more preferably 0.5 to 5.0 mass % of the total amount of the main agent because this leads to a more excellent effect of the technology.

(Silane Coupling Agent (F))

The main agent preferably further contains a silane coupling agent (F) because this leads to a more excellent effect of the technology.

A silane coupling agent is a compound having a hydrolyzable silyl group and a functional group different from a hydrolyzable silyl group.

Examples of the hydrolyzable silyl group include an alkoxysilyl group and a silanol group.

Alkoxysilyl Group

An alkoxysilyl group that the silane coupling agent (F) may have is a group in which one to three alkoxy groups are bonded to silicon.

Examples of the alkoxy group include a methoxy group and an ethoxy group.

Group Other than Alkoxy Group

When the number of alkoxy groups in the alkoxysilyl group is one or two, there is no particular limitation on the remaining group(s) bonded to the silicon atom. Examples of the remaining group(s) include a hydrocarbon group that may have a hetero atom, more specifically, an unsubstituted hydrocarbon group.

Examples of the alkoxysilyl group include a methoxy silyl group and an ethoxy silyl group.

Silanol Group

A silanol group that the silane coupling agent (F) may have is a group in which one to three OH groups are bonded to silicon.

Examples of the silanol group include one obtained by partially or fully hydrolyzing an alkoxy group in the alkoxysilyl group.

When the main agent further contains the silane coupling agent (F), the silane coupling agent (F) preferably has the alkoxysilyl group because this leads to a more excellent effect of the technology.

A functional group different from the hydrolyzable silyl group in the silane coupling agent (F) is preferably an isocyanate group, a mercapto group, a monosulfide group (e.g., —C—S—Si bond), or an amino group (which covers the concepts of a primary amino group, a secondary amino group, and a tertiary amino group) because this leads to a more excellent effect of the technology.

The hydrolyzable silyl group and the functional group different from the hydrolyzable silyl group may be bonded via an organic group. The organic group is not particularly limited, and examples thereof include a hydrocarbon group such as an aliphatic hydrocarbon group.

The hydrolyzable silyl group and the hydrocarbon group as the organic group may be bonded via a monosulfide bond (—S—).

The silane coupling agent (F) preferably contains an isocyanate group-containing silane coupling agent (e.g., a silane coupling agent (F-1) to be described later) or a monosulfide-containing silane coupling agent (F-2), more preferably contains the silane coupling agent (F-1) and/or the monosulfide-containing silane coupling agent (F-2), and even more preferably contains the silane coupling agent (F-1), because this leads to a more excellent effect of the technology. The silane coupling agent (F-1) is obtained by reacting a modified product of aliphatic polyisocyanate and an amino silane coupling agent and has a skeleton derived from the modified product and an isocyanate group.

Examples of the modified product of aliphatic polyisocyanate that is a raw material of the silane coupling agent (F-1) include isocyanurates, biurets, and allophanates of a hydrocarbon compound having plural isocyanate groups.

The modified product of aliphatic polyisocyanate preferably includes a biuret of aliphatic polyisocyanate and more preferably includes a biuret of HDI because this leads to a more excellent effect of the technology.

Examples of the amino silane coupling agent that is a raw material of the silane coupling agent (F-1) include a silane coupling agent having an $NH_2$ group and/or an NH group.

The amino silane coupling agent preferably has an $NH_2$ group or an NH group, with the number of $NH_2$ groups being zero or one per molecule of the amino silane coupling agent, and the total number of $NH_2$ groups and NH groups being one or more, because this leads to a more excellent effect of the technology.

The amino silane coupling agent preferably contains (N-phenyl)aminoalkyltrialkoxysilane and more preferably contains (N-phenyl)aminopropyltrimethoxysilane because this leads to a more excellent effect of the technology.

The modified product of aliphatic polyisocyanate and the amino silane coupling agent are preferably reacted in such amounts that the number of moles of an isocyanate group in the modified product is excessive relative to the number of moles of an amino group in the amino silane coupling agent.

Monosulfide-Containing Silane Coupling Agent (F-2)

The monosulfide-containing silane coupling agent (F-2) is a monosulfide compound that has a monosulfide bond and a hydrolyzable silyl group, with the monosulfide bond being directly bonded to a silicon atom that the hydrolyzable silyl group has.

One preferred example of the monosulfide-containing silane coupling agent (F-2) is one further having a second hydrolyzable silyl group in addition to the hydrolyzable silyl group bonded to the monosulfide bond because this leads to a more excellent effect of the technology.

Examples of the second hydrolyzable silyl group may be the same as those of the hydrolyzable silyl group bonded to the monosulfide bond, and the second hydrolyzable silyl group may be the same as or different from the hydrolyzable silyl group bonded to the monosulfide bond.

The second hydrolyzable silyl group may be bonded to the monosulfide bond via a hydrocarbon group. The hydrocarbon group is not particularly limited.

Examples of the hydrocarbon group include an alkylene group (e.g., an alkylene group with 1 to 10 carbon atoms), a cycloalkylene group, an arylene group, and combinations thereof. The hydrocarbon group may be linear or branched.

The monosulfide-containing silane coupling agent (F-2) preferably includes a compound represented by Formula (11) for the sake of more excellent adhesion.

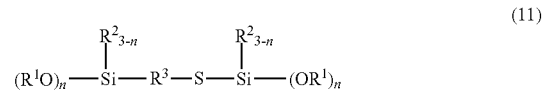

(11)

In the formula, $R^1$ and $R^2$ each independently represent a hydrocarbon group that may have a hetero atom, n's each independently represent an integer of 1 to 3, and $R^3$ represents a hydrocarbon group.

The hydrocarbon group that may have a hetero atom as represented by $R^1$ is not particularly limited, and for instance, may be the same as a hydrocarbon group that an alkoxy group has in the alkoxysilyl group.

The hydrocarbon group that may have a hetero atom as represented by $R^2$ is the same as the foregoing hydrocarbon group that may have a hetero atom which is exemplified as a group that can be bonded to a silicon atom of the hydrolyzable silyl group when the number of alkoxy groups in one hydrolyzable silyl group is one or two.

Preferably, n's each independently represent 3.

The hydrocarbon group represented by $R^3$ is the same as the foregoing hydrocarbon group via which the second hydrolyzable silyl group and the monosulfide bond may be bonded. Examples of this hydrocarbon group include —$C_mH_{2m}$—. m is preferably an integer of 1 to 5.

The monosulfide-containing silane coupling agent (F-2) preferably includes a compound (triethoxysilylthiopropyltrimethoxysilane) represented by Formula (12) for the sake of more excellent adhesion.

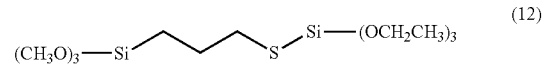

(12)

Content of Silane Coupling Agent (F)

When the main agent further contains the silane coupling agent (F), the silane coupling agent (F) content is preferably 0.02 to 5 mass % of the total amount of the adhesive composition of the technology. Note that when the curing agent further contains the compound (D), the silane coupling agent (F) content of the main agent may be the same as above.

[Curing Agent]

In the present technology, the curing agent (curing agent in a broad sense) contains water and the active hydrogen-containing compound (B) having a plurality of active hydrogens, and the active hydrogen-containing compound (B) includes a nitrogen-containing compound represented by Formula (4) which will be described later.

Water and the active hydrogen-containing compound (B) having a plurality of active hydrogens react with the polyisocyanate component (A) and thereby are able to serve as a curing agent (curing agent in a narrow sense) that can cure the adhesive composition of the technology.

[Water]

Water contained in the curing agent (curing agent in a broad sense) is not particularly limited. One example thereof is purified water.

[Active Hydrogen-Containing Compound (B)]

The active hydrogen-containing compound (B) contained in the curing agent (curing agent in a broad sense) is a compound having two or more active hydrogens per molecule. However, the active hydrogen-containing compound (B) has no silicon in the present technology.

[Active Hydrogen (B-H)]

Active hydrogens (B-H) of the active hydrogen-containing compound (B) may form a functional group such as a hydroxy group, an amino group, an imino group, a mercapto group, or a carboxy group.

Active hydrogens (B-H) of the (B) preferably form a hydroxy group or an amino group because this leads to a more excellent effect of the technology.

The (B) preferably has two to four active hydrogens (B-H) per molecule because this leads to a more excellent effect of the technology.

Main Chain Skeleton of (B)

The main chain skeleton of the (B) is not particularly limited. Examples thereof include hydrocarbon, polyether, polyester, and combinations thereof.

Nitrogen-Containing Compound Represented by Formula (4)

In the present technology, the active hydrogen-containing compound (B) includes a nitrogen-containing compound represented by Formula (4) below (a compound represented by Formula (4)).

$$H\text{-}(O\text{-}R_6)_a \diagdown N\text{---}R_{10}\text{---}N \diagup (R_8\text{-}O)_c\text{-}H \atop H\text{-}(O\text{-}R_7)_b \diagup \phantom{N\text{---}R_{10}\text{---}N} \diagdown (R_9\text{-}O)_d\text{-}H \tag{4}$$

In Formula (4), $R_6$ to $R_9$ each independently represent an alkylene group, $R_{10}$ represents an alkylene group or a polyoxyalkylene group, and a to d each independently represent 0 to 10.

Examples of the alkylene group of $R_6$ to $R_9$ in Formula (4) include an ethylene group and a propylene group.

Examples of an alkylene group with 2 to 10 carbon atoms of $R_{10}$ include an ethylene group, a tetramethylene group, a pentylene group, a hexylene group, an octylene group, and a decylene group. An ethylene group is preferred for the alkylene group with 2 to 10 carbon atoms. $R_{10}$ may be a part of the skeleton of the (B).

For polyether as the skeleton that the (B) may have, for example, when a in Formula (4) is 3 or more, H—(O—$R_6)_a$— is to be polyether having a hydroxy group at its end. The same applies to b to d.

Examples of the compound represented by Formula (4) include a nitrogen-containing compound 1, a nitrogen-containing compound 2, and a nitrogen-containing compound 3, which are described below.

Nitrogen-Containing Compound 1

The nitrogen-containing compound 1 is a tetrafunctional hydroxy compound represented by Formula (4) above, where $R_6$ to $R_9$ each independently represent a propylene group and/or an ethylene group, $R_{10}$ represents an alkylene group with 2 to 10 carbon atoms, a to d each independently represent 1 to 10, and at least one of a to d is 3 or more.

The weight-average molecular weight of the nitrogen-containing compound 1 is preferably 200 to 2,000 and more preferably 400 to 800 because this leads to a more excellent effect of the technology.

Nitrogen-Containing Compound 2

The nitrogen-containing compound 2 is a compound represented by Formula (5). The nitrogen-containing compound 2 is a tetrafunctional hydroxy compound.

$$H\text{---}(O\text{-}R_{56})_a \diagdown N\text{---}R_{50}\text{---}N \diagup (R_{58}\text{-}O)_c\text{---}H \atop H\text{---}(O\text{-}R_{57})_b \diagup \phantom{N\text{---}R_{50}\text{---}N} \diagdown (R_{59}\text{-}O)_d\text{---}H \tag{5}$$

In Formula (5), $R_{56}$ to $R_{59}$ each independently represent a propylene group and/or an ethylene group, $R_{50}$ represents an alkylene group with 2 to 10 carbon atoms, a to d each independently represent 1 or 2, and at least one of a to d is 2.

The alkylene group with 2 to 10 carbon atoms represented by $R_{50}$ in Formula (5) is the same as $R_{10}$ in Formula (4).

The weight-average molecular weight of the nitrogen-containing compound 2 is preferably 100 to 1,000 and more preferably 200 to 500 because this leads to a more excellent effect of the technology.

Nitrogen-Containing Compound 3

The nitrogen-containing compound 3 is a diamine compound represented by Formula (4), where $R_6$ to $R_9$ each independently represent an alkylene group, $R_{10}$ represents a polyoxyalkylene group, and a to d each represent 0.

The curing agent preferably contains at least one selected from the group consisting of the nitrogen-containing compounds 1 to 3 and more preferably contains the nitrogen-containing compound 1 because this leads to a more excellent effect of the technology.

When the curing agent contains the nitrogen-containing compound 1, the curing agent preferably further contains the nitrogen-containing compound 2 and/or the nitrogen-containing compound 3 and more preferably the nitrogen-containing compound 2 because this leads to a more excellent effect of the technology.

The active hydrogen-containing compound (B) may further include an active hydrogen-containing compound (another active hydrogen-containing compound) other than the compound represented by Formula (4).

Examples of another active hydrogen-containing compound include: polyols such as polyether polyol having no nitrogen atom, polybutadiene polyol, polyester polyol, and sugar-based polyol; and amine compounds excluding a compound in which at least one of a to d is 0 in Formula (4).

The active hydrogen-containing compound (B) preferably further contains polyether polyol having three or more hydroxy groups in addition to the compound represented by Formula (4) because this leads to a more excellent effect of the technology (especially, an excellent result in a creep test 5 to be described later).

The active hydrogen-containing compound (B) preferably further contains at least one selected from the group consisting of polybutadiene polyol, polyester polyol, and polyether polyol having two hydroxy groups, in addition to the compound represented by Formula (4), because this leads to a more excellent effect of the technology (especially, excellent shear strength).

In the present technology, the weight-average molecular weight of an active hydrogen compound may be deemed a polystyrene-equivalent value obtained by gel permeation chromatography using a solvent of tetrahydrofuran (THF). The method and conditions for measurement of the weight-average molecular weight of an active hydrogen compound in the present technology is as follows.

(Method and Conditions for Measurement of Weight-Average Molecular Weight of Active Hydrogen Compound)
  GPC: LC Solution (manufactured by Shimadzu Corporation)
  Detector: SPD-20A (manufactured by Shimadzu Corporation)
  Column: Two columns, Shim-pack GPC-801 (commercial name) (manufactured by Shimadzu Corporation), arranged in series
  Solvent: Tetrahydrofuran
  Temperature: 40° C.
  Flow rate: 0.5 ml/min
  Concentration: 2 mg/ml
  Reference sample: Polystyrene

[Average Active Hydrogen Concentration (BH-c) of (B)]

In the present technology, the average active hydrogen concentration (BH-c) of the active hydrogen-containing compound (B) is 0.50 to 3.50 mol/kg.

The average active hydrogen concentration (BH-c) of the active hydrogen-containing compound (B) is expressed by the number of moles of the total active hydrogens in the active hydrogen-containing compound (B) with respect to the total amount (kg) of the active hydrogen-containing compound (B).

The (BH-c) is preferably 0.7 to 3.5 mol/kg and more preferably 1.5 to 2.9 mol/kg because this leads to a more excellent effect of the technology.

In the present technology, the average active hydrogen concentration (BH-c) of the active hydrogen-containing compound (B) can be calculated from the active hydrogen concentrations and content (mass) of each active hydrogen-containing compound (B).

The active hydrogen concentration of the active hydrogen-containing compound (B) can be calculated from the hydroxyl value of the active hydrogen-containing compound (B). In other words, this can be obtained by dividing the hydroxyl value of each active hydrogen-containing compound (B) by the molecular weight of KOH.

The hydroxyl value of the active hydrogen-containing compound (B) can be measured according to JIS K 1557.

Content of Active Hydrogen-Containing Compound (B)

The content of the active hydrogen-containing compound (B) (the total content when two or more active hydrogen-containing compounds (B) are contained) is preferably 50 to 90 mass %, more preferably 55 to 80 mass %, and even more preferably 60 to 70 mass % of the total amount of the curing agent because this leads to a more excellent effect of the technology.

[Average Active Hydrogen Concentration (BWH-c)]

In the present technology, the average active hydrogen concentration (BWH-c) of the active hydrogen-containing compound (B) and water is 2.00 to 8.00 mol/kg.

The average active hydrogen concentration (BWH-c) of the active hydrogen-containing compound (B) and water is expressed by the sum of the number of moles of active hydrogens in the active hydrogen-containing compound (B) and the number of moles of active hydrogens in the water with respect to the total amount (kg) of the active hydrogen-containing compound (B) and the water.

The (BWH-c) is preferably 2.50 to 6.50 mol/kg, more preferably 3.20 to 5.50 mol/kg, even more preferably 3.7 to 5.50 mol/kg, and particularly preferably 4.20 to 5.20 mol/kg because this leads to a more excellent effect of the technology.

In the present technology, the average active hydrogen concentration (BWH-c) of the active hydrogen-containing compound (B) and water can be calculated from the active hydrogen concentrations and contents (masses) of the active hydrogen-containing compound (B) and the water.

The active hydrogen concentration and content of the active hydrogen-containing compound (B) are the same as above.

(Active Hydrogen Concentration of Water)

In the present technology, the active hydrogen concentration of water is set to 111.1 mol/kg. This value was obtained by dividing the hydroxyl value of water, which was specified as 6233 mgKOH/g, by the molecular weight of KOH.

The hydroxyl value of water being 6233 mgKOH/g based on calculation is described in, for example, paragraph [0043] of Japan Unexamined Patent Publication No. 2005-249957 A, paragraph [0050] of Japan Unexamined Patent Publication No. 2009-156944 A, and paragraph [0103] of Japan Unexamined Patent Publication No. 2011-68719 A.

Water Content

The water content is preferably 0.1 to 5 mass %, more preferably 1.1 to 2.5 mass %, and even more preferably 1.2 to 1.5 mass % of the total amount of the curing agent because this leads to a more excellent effect of the technology.

(Compound (D))

The curing agent preferably further contains the compound (D) having an alkoxysilyl group and/or a silanol group because this leads to a more excellent effect of the technology. When the curing agent further contains the compound (D), it is preferable for the compound (D) to have a silanol group.

Alkoxysilyl Group, Silanol Group

An alkoxysilyl group and a silanol group that the compound (D) may have are the same as those that the silane coupling agent (F) may have.

The compound (D) may contain a functional group other than an alkoxysilyl group and a silanol group because this leads to a more excellent effect of the technology. The functional group is preferably an amino group and/or an imino group.

The compound (D) preferably contains a compound having an alkoxysilyl group and/or a silanol group as well as an amino group (which covers the concepts of a primary amino group, a secondary amino group, and a tertiary amino group), and more preferably contains an amino silane coupling agent having an alkoxysilyl group and/or a silanol group as well as a plurality of amino groups, because this leads to a more excellent effect of the technology.

The amino silane coupling agent having a plurality of amino groups as the compound (D) has, as its skeleton, preferably an organic chain or a siloxane skeleton and more preferably an organic chain because this leads to a more excellent effect of the technology.

The organic chain as the skeleton is not particularly limited.

The siloxane skeleton as the skeleton is not particularly limited. One example of the siloxane skeleton is one represented by —Si—(O—Si)n-O—Si—, where n is 0 or more.

Examples of the amino silane coupling agent having a plurality of amino groups include a monomer-level, amino group-containing silane coupling agent, and an oligomer thereof.

Examples of the monomer-level, amino group-containing silane coupling agent include N-(aminoalkyl)-aminoalkyltrialkoxysilane (having one primary amino group and one secondary amino group) such as N-2-(aminoethyl)-3-aminopropyltrimethoxysilane.

One preferable example of the amino silane coupling agent having a plurality of amino groups is an oligomer of an amino group-containing silane coupling agent.

Oligomer of Amino Group-Containing Silane Coupling Agent

An oligomer of an amino group-containing silane coupling agent is not particularly limited as long as it is a compound obtained by oligomerization of an amino group-containing silane coupling agent. In this case, it is sufficient that an amino group-containing silane coupling agent that may form an oligomer has one or more amino groups. An amino group-containing silane coupling agent that may form an oligomer may further have a reactive group for oligomerization.

The degree of polymerization of an oligomer is not particularly limited and is preferably 3 to 10, more preferably 3 to 8, and even more preferably 4 to 8.

Examples of the oligomer of an amino group-containing silane coupling agent as the compound (D) include a compound obtained by oligomerization of an amino group-containing silane coupling agent, with a skeleton of the thus-obtained oligomer having an organic chain or a siloxane skeleton. When the skeleton of the oligomer is an organic chain, the skeleton can be bonded with an alkoxysilyl group and/or a silanol group as well as plural amino groups. When the skeleton of the oligomer is a siloxane skeleton, silicon that is a constituent of the siloxane skeleton may be bonded to a hydrocarbon group, an OH group, or an alkoxy group, and the skeleton can be bonded with plural amino groups.

Content of Compound (D)

When the curing agent further contains the compound (D), the compound (D) content is preferably 0.002 to 5 mass % of the total amount of the adhesive composition of the technology because this leads to a more excellent effect of the technology.

Total Content of Silane Coupling Agent (F) and Compound (D)

When the main agent further contains the silane coupling agent (F) and the curing agent further contains the compound (D), the total content of the silane coupling agent (F) and the compound (D) is preferably 0.03 to 5 mass % of the total amount of the adhesive composition of the technology because this leads to a more excellent effect of the technology.

[Amounts of Main Agent and Curing Agent to be Mixed]

In the present technology, the amounts of the main agent and the curing agent to be mixed satisfy the following conditions: a ratio R2 of the number of isocyanate groups of the polyisocyanate component (A) to the number of active hydrogens (B-H) of the active hydrogen-containing compound (B) (NCO/H) is 1 to 5; and a ratio R3 of the number of isocyanate groups of the polyisocyanate component (A) to the total number of active hydrogens of the active hydrogen-containing compound (B) and water (NCO/H) is 0.5 to 2.5.

[Ratio R2 (NCO/H)]

The ratio R2 of the number of isocyanate groups of the polyisocyanate component (A) to the number of active hydrogens (B-H) of the active hydrogen-containing compound (B) (NCO/H) is preferably 1.5 to 4.5 because this leads to a more excellent effect of the technology.

[Ratio R3 (NCO/H)]

The ratio R3 of the number of isocyanate groups of the polyisocyanate component (A) to the total number of active hydrogens of the active hydrogen-containing compound (B) and the water (NCO/H) is preferably 1.0 to 1.8 because this leads to a more excellent effect of the technology.

(Additives)

The adhesive composition of the technology may optionally further contain additives as long as the object of the technology is not impaired. Exemplary additives include: fillers such as carbon black and calcium carbonate; plasticizers such as diisononyl phthalate; catalysts such as a metal catalyst and an amine-based catalyst; a compound (E) having a skeleton derived from terpene; an antioxidant; an antiaging agent; and a thixotropic agent. The types and contents of additives can be suitably selected.

Each additive as above can be added to one or both of the main agent and the curing agent.

Filler Content

When the adhesive composition of the technology further contains a filler, the filler content is preferably 20 to 80 mass % of the total amount of the adhesive composition of the technology.

Plasticizer Content

When the adhesive composition of the technology further contains a plasticizer, the plasticizer content is preferably 2 to 50 mass % of the total amount of the adhesive composition of the technology.

Compound (E) Having a Skeleton Derived from Terpene

In the adhesive composition of the technology, the main agent and/or the curing agent preferably further contains a compound (E) having a skeleton derived from terpene because this leads to a more excellent effect of the technology.

Examples of the compound (E) having a skeleton derived from terpene include a compound having a skeleton derived from monoterpene, more specifically, an adduct of camphene and phenol.

One exemplary adduct of camphene and phenol is an adduct including at least one compound selected from the group consisting of a compound 1 represented by Formula (Z1-1), a compound 2 represented by Formula (Z1-2), a compound 3 represented by Formula (Z2-1), a compound 4 represented by Formula (Z2-2), and a compound 5 represented by Formula (Z3-1).

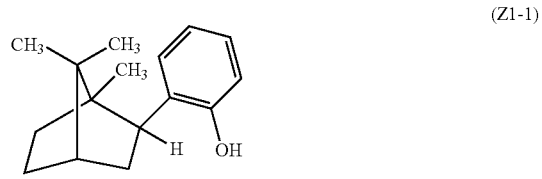

(Z1-1)

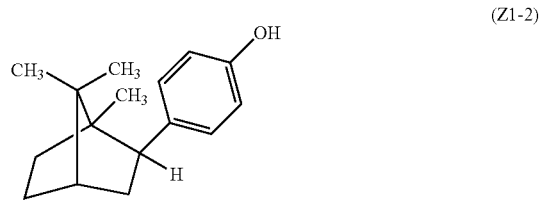

(Z1-2)

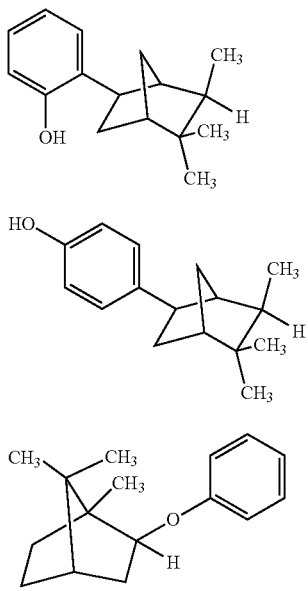

When the adhesive composition of the technology further contains the compound (E) having a skeleton derived from terpene, the compound (E) content is preferably 0.2 to 10 mass % of the total amount of the adhesive composition of the technology because this leads to a more excellent effect of the technology.

Metal Catalyst

A metal catalyst is not particularly limited as long as it is a compound that has metal and that can activate the reaction of an isocyanate group. Examples of the metal catalyst include a bismuth-based catalyst and a tin-based catalyst, more specifically, a bismuth-based catalyst such as bismuth trioctate, and a tetravalent tin catalyst such as dioctyltin(IV) dilaurate.

When the adhesive composition of the technology further contains the metal catalyst, the metal catalyst content is preferably 0.001 to 0.1 mass % of the total amount of the adhesive composition of the technology.

Amine-Based Catalyst

An amine-based catalyst is not particularly limited as long as it is a compound that has an amino group, an imino group, or a tertiary amino group and that can activate the reaction of an isocyanate group. Examples of the amine-based catalyst include a catalyst having a tertiary amino group, more specifically, monomorpholine compounds such as dimethylaminoethylmorpholine, dimorpholine compounds such as dimorpholinodiethyl ether, chain ether compounds such as bis(dimethylaminoethyl) ether, and 1,4-diazobicyclo[2,2,2] octane.

When the adhesive composition of the technology further contains the amine-based catalyst, the amine-based catalyst content is preferably 0.1 to 2.0 mass % of the total amount of the adhesive composition of the technology.

(Manufacturing Method)

The method of manufacturing the adhesive composition of the technology is not particularly limited. For instance, the main agent can be prepared by sufficiently mixing the polyisocyanate component (A), the aliphatic diisocyanate derivative (C), the silane coupling agent (F), the filler, the metal catalyst, the amine-based catalyst, the compound (E) having a skeleton derived from terpene, and other components in a nitrogen gas atmosphere.

The curing agent can be prepared by sufficiently mixing water, the compound represented by Formula (4), another active hydrogen-containing compound (B), the compound (D), the filler, the metal catalyst, the amine-based catalyst, the compound (E) having a skeleton derived from terpene, and other components.

(Use)

When the adhesive composition of the technology is used, the main agent and the curing agent are mixed to meet the amounts of the main agent and the curing agent to be mixed as described above, and the mixture thus obtained is usable as the adhesive composition of the technology.

The adhesive composition of the technology can cure under the condition of, for example, −20° C. to +50° C.

A "polyurethane adhesive composition" in the present technology means that a cured product obtained from the adhesive composition of the technology becomes a urethane polymer in a broad sense, i.e., a polymer (polyurethane) compound derived from an isocyanate group.

The composition of the technology is usable as an adhesive.

An adherend (substrate) to which the adhesive composition of the technology is applicable is not particularly limited. Examples thereof include metals (including a painted board and an electrodeposited steel sheet), plastics, rubbers, and glasses.

A primer may be optionally used for the adherend. The primer is not particularly limited, and examples thereof include a composition containing a compound having an isocyanate group and/or a hydrolyzable silyl group such as an alkoxysilyl group.

The adhesive composition of the technology is usable as, for instance, an adhesive for bonding a vehicle body with window glass, and an adhesive for bonding parts such as a locating pin and a hinge with window glass.

EXAMPLES

The present technology is described below more specifically by way of examples. However, the present technology should not be construed as being limited to the following examples. Note that "%" is intended to mean "mass %" unless otherwise specified.

<Preparation of Polyisocyanate Component (A)>

1. Polyisocyanate Component (A1)

A mixture containing the components below was reacted at 80° C. for 5 hours to prepare a polyisocyanate component (A1) containing a urethane prepolymer (A-3-1). In the following, F represents the number of functional groups, Mw the weight-average molecular weight, and OHV the hydroxyl value (unit: mgKOH/g).

(Particulars of Components, Amounts of Components Mixed, and Obtained Polyisocyanate Component (A1))

Active Hydrogen-Containing Compound (A-1)

SANNIX PL-2100 (polyoxyethylene polyoxypropylene glycol; F=2; Mw=2400; OHV, 44; manufactured by Sanyo Chemical Industries, Ltd.) 198 parts by mass EXCENOL 1020 (polyoxypropylene polyol; F=2; Mw=1000; OHV, 112; manufactured by AGC Inc.) 71 parts by mass EXCENOL 837 (ethylene oxide-added polyoxypropylene polyol; F=3; Mw=6000; OHV, 28; manufactured by AGC Inc.; the same applies below) 443 parts by mass Isocyanate Compound (A-2)
  MDI (MILLIONATE MT) (NCO2 functionality; manufactured by Tosoh Corporation; the same applies below) 109 parts by mass
  821 parts by mass in total
  Ratio R1 (NCO/H)=1.68
  NCO % of polyisocyanate component (A1): 1.80%
  Remaining MDI monomers in polyisocyanate component (A1): 2%
2. Polyisocyanate Component (A2)
A mixture containing the components below was reacted at 80° C. for 5 hours to prepare a polyisocyanate component (A2) containing a urethane prepolymer (A-3-2). F represents the number of functional groups.
(Particulars of Components, Amounts of Components Mixed, and Obtained Polyisocyanate Component (A2))
Active Hydrogen-Containing Compound (A-1)
  EXCENOL 2020 (F=2; Mw=2000; OHV, 56; manufactured by AGC Inc.) 230 parts by mass
  EXCENOL 837 (the same as above) 690 parts by mass
  Isocyanate compound (A-2)
  MDI (the same as above) 574 parts by mass
  1494 parts by mass in total
  Ratio R1 (NCO/H)=8.00
  NCO % of polyisocyanate component (A2): 11.73%
  Remaining MDI monomers in polyisocyanate component (A2): 29%
<Preparation of Silane Coupling Agent (F-1-1)>
A mixture containing the components below was reacted at 40° C. for 8 hours to prepare a silane coupling agent (F-1-1) having an alkoxysilyl group and/or a silanol group and also having an isocyanate group.
(Particulars of Components, Amounts of Components Mixed, and Obtained Silane Coupling Agent (F-1-1))
  Biuret of HDI (D-165N; manufactured by Mitsui Chemicals, Inc.) 100 g
  3-(N-Phenyl)aminopropyltrimethoxysilane (Y-9669; manufactured by Momentive Performance Materials; the same applies below) 47.2 g
  NCO % of silane coupling agent (F-1-1): 10.55%
  The silane coupling agent (F-1-1) has on average two isocyanate groups and one trimethoxy silyl group per molecule.
<Preparation of Silane Coupling Agent (F-1-2)>
A mixture containing the components below was reacted at 40° C. for 8 hours to prepare a silane coupling agent (F-1-2) having an alkoxysilyl group and/or a silanol group and also having an isocyanate group.
(Particulars of Components, Amounts of Components Mixed, and Obtained Silane Coupling Agent (F-1-2))
  An isocyanurate of HDI (D-170N; manufactured by Mitsui Chemicals, Inc.) and 3-(N-phenyl)aminopropyltrimethoxysilane (the same as above) are reacted at a molar ratio of 3:1.
  NCO % of silane coupling agent (F-1-2): 10.36%
  The silane coupling agent (F-1-2) has on average two isocyanate groups and one trimethoxy silyl group per molecule.
<Manufacture of Adhesive Composition>
Main Agent
Each main agent was prepared using the components shown in Tables 1 to 3 (see FIGS. 3A-5L) with the relevant composition (parts by mass) shown in those tables.
Below are the particulars of the components shown in the "Main agent" spaces in Tables 1 to 3.

<Polyisocyanate Component (A)>
  Polyisocyanate component (A1): The polyisocyanate component (A1) prepared as above
  Polyisocyanate component (A2): The polyisocyanate component (A2) prepared as above
  Plasticizer: DINP, diisononyl phthalate; manufactured by J-PLUS Co., Ltd.
  Aliphatic diisocyanate derivative (C): A mixture of an isocyanurate of pentamethylene diisocyanate and an allophanate of pentamethylene diisocyanate; commercial name, D-376N; manufactured by Mitsui Chemicals, Inc.; NCO %=23.6%
(Silane Coupling Agent (F))
  Silane coupling agent (F-2-1): A monosulfide-containing silane coupling agent (the structure of Formula (12)); commercial name, X-12-1056ES; manufactured by Shin-Etsu Chemical Co., Ltd.

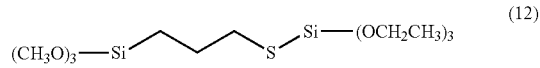

Silane coupling agent (F-1-1): The silane coupling agent (F-1-1) prepared as above; NCO %=10.55%
  Silane coupling agent (F-1-2): The silane coupling agent (F-1-2) prepared as above; NCO %=10.36%
  Compound having skeleton derived from monoterpene (E1): An adduct of camphene and phenol, the adduct including at least one compound selected from the group consisting of a compound 1 represented by Formula (Z1-1), a compound 2 represented by Formula (Z1-2), a compound 3 represented by Formula (Z2-1), a compound 4 represented by Formula (Z2-2), and a compound 5 represented by Formula (Z3-1); manufactured by Yasuhara Chemical Co., Ltd.

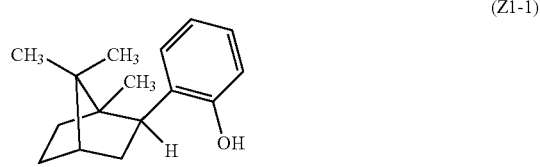

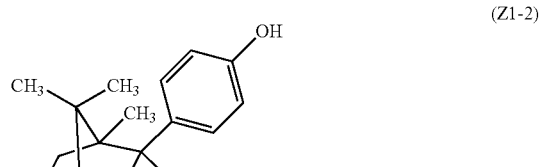

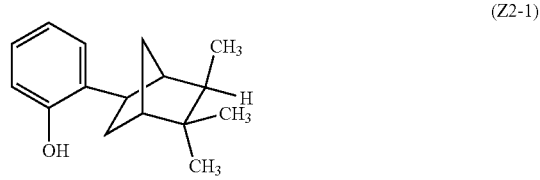

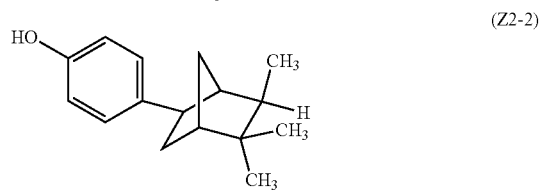

-continued

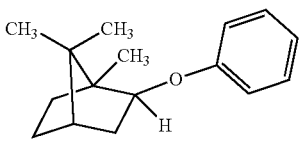

(Z3-1)

(Filler)
Filler 1 (carbon): Commercial name, Niteron #200; manufactured by Nippon Steel Carbon Co., Ltd.; HAF carbon black
Filler 2 (calcium carbonate): Heavy calcium carbonate; commercial name, Super S; manufactured by Maruo Calcium Co., Ltd.

(Metal Catalyst)
Metal catalyst 1: Bismuth trioctate; commercial name, NEOSTANN U-600; manufactured by Nitto Kasei Co., Ltd.
Metal catalyst 2: DOTL, dioctyltin(IV) dilaurate; NEOSTANN U-810; manufactured by Nitto Kasei Co., Ltd.

(Amine-Based Catalyst)
Amine-based catalyst 1: Dimethylaminoethylmorpholine; commercial name, X-DM; manufactured by Evonik
Amine-based catalyst 2: Bis(dimethylaminoethyl) ether; commercial name, BL-19; manufactured by Evonik
Amine-based catalyst 3: DMDEE, dimorpholinodiethyl ether; manufactured by San-Apro Ltd.; following structure

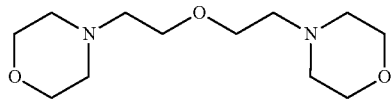 [SMILES: C1CN(CCOCCN2CCOCC2)CCO1]

Curing Agent

Each curing agent was prepared using the components shown in the "Curing agent" spaces in Tables 1 to 3 (in FIGS. 3A-5L) with the relevant composition (parts by mass) shown in those tables.

Below are the particulars of the components shown in the "Curing agent" spaces in Tables 1 to 3.

<Active Hydrogen-Containing Compound (B)>
Active hydrogen-containing compound (B1): Polyether polyol; commercial name, EXCENOL 837; manufactured by AGC Inc.; active hydrogen concentration, 0.50 mol/kg; hydroxyl value, 28 mgKOH/g; F (which represents the average hydroxyl value per molecule of polyol)=3; weight-average molecular weight, 6000

Active hydrogen-containing compound (B2): Polyether tetraol; commercial name, EXCENOL 450ED; manufactured by AGC Inc.; active hydrogen concentration, 8.02 mol/kg; hydroxyl value, 450 mgKOH/g; a compound having four hydroxy groups per molecule represented by formula (4); corresponding to the nitrogen-containing compound 1 among compounds represented by Formula (4); weight-average molecular weight, 550; having a liquid form under the condition of room temperature (23° C.).

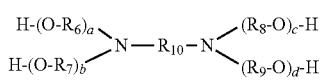

(4)

In Formula (4), $R_6$ to $R_9$ each independently represent a propylene group, $R_{10}$ represents an ethylene group, and a to d each independently represent 1 to 10. At least one of a to d is 3 or more.

Active hydrogen-containing compound (B3): N-Polyoxyalkylene polyalkylene polyamine; commercial name, Adeka Polyether BM-34; manufactured by ADEKA Corporation; active hydrogen concentration, 14.74 mol/kg; hydroxyl value, 827 mgKOH/g; a compound having four hydroxy groups per molecule represented by Formula (5); Corresponding to the nitrogen-containing compound 2 among compounds represented by Formula (4); weight-average molecular weight, 280; having a liquid form under the condition of room temperature (23° C.).

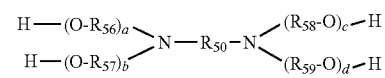

(5)

In Formula (5), $R_{56}$ to $R_{59}$ each independently represent a propylene group and/or an ethylene group, $R_{50}$ represents an ethylene group, and a to d each independently represent 1 or 2. At least one of a to d is 2.

Active hydrogen-containing compound (B4): Polyol with a polybutadiene skeleton; commercial name, Poly bd R15HT; manufactured by Idemitsu Kosan Co., Ltd.; active hydrogen concentration, 1.83 mol/kg; hydroxyl value, 103 mgKOH/g; F=2

Active hydrogen-containing compound (B5): Polyol with a polybutadiene skeleton; commercial name, Poly bd R45HT; manufactured by Idemitsu Kosan Co., Ltd.; active hydrogen concentration, 0.83 mol/kg; hydroxyl value, 47 mgKOH/g; F=2

Active hydrogen-containing compound (B6): Polyether polyol; commercial name, EXCENOL 1020; manufactured by AGC Inc.; active hydrogen concentration, 2.00 mol/kg; hydroxyl value, 112 mgKOH/g; F=2

Active hydrogen-containing compound (B7): Polyester polyol obtained from 2,4-diethyl-1,5-pentanediol and phthalic anhydride; commercial name, HS 2N-226P; manufactured by Hokoku Corporation; active hydrogen concentration, 0.94 mol/kg; hydroxyl value, 53 mgKOH/g; F=2

Active hydrogen-containing compound (B8): Amine having polypropylene glycol (PPG) as its skeleton and two amino groups (four active hydrogens); corresponding to the nitrogen-containing compound 3 among compounds represented by Formula (4); commercial name, JEFFAMINE D-400; manufactured by San Techno Chemical; active hydrogen concentration, 9.30 mol/kg Comparative active hydrogen-containing compound: Sugar-based polyol; commercial name, EXCENOL 450SN; manufactured by AGC Inc.; active hydrogen concentration, 8.0 mol/kg; hydroxyl value, 450 mgKOH/g; F =4 or more Water: Purified water Compound having skeleton derived from monoterpene (E2): The same as the (E1) contained in the main agent (Alkoxysilyl group- and/or silanol group-containing compound (D))

Compound (D-1-1): An oligomer of an amino group-containing silane coupling agent; commercial name, KBP90; manufactured by Shin-Etsu Chemical Co., Ltd.; solid concentration, 30%; solvent, water Compound (D-1-2): An oligomer of an amino group-containing silane coupling agent; commercial name, X-12-972F; manufactured by Shin-Etsu Chemical Co., Ltd.; solid concentration, 15%; solvent, alcohol Compound (D-1-3): N-2-(Aminoethyl)-3-aminopropyltrimethoxysilane; commercial name, KBM-603; manufactured by Shin-Etsu Chemical Co., Ltd.

Filler 3 (calcium carbonate): Calcium carbonate; commercial name, KALFINE 200; manufactured by Maruo Calcium Co., Ltd.

Amine-based catalyst 4: TEDA; 1,4-Diazobicyclo [2,2,2]octane

Metal catalyst 4: Dibutyltin bis(acetylacetonate); commercial name, U-220H; manufactured by Nitto Kasei Co., Ltd.

Metal catalyst 2: The same as the metal catalyst 2 used in the main agent

<Mixing of Main Agent and Curing Agent>

The main agent and the curing agent were mixed at a mass ratio shown in the "(mixture of main agent and curing agent)" spaces in Tables 1 to 3 (see FIGS. 3A-5L) to obtain each mixture. The ratio R2 (NCO/H) and the ratio R3 (NCO/H) at this time are stated along with the mass ratio.

<Evaluation>

The following evaluations were carried out using the mixtures manufactured as above. The results are shown in the "(evaluation result)" spaces in Tables 1 to 3 (see FIGS. 3A-5L). The evaluation methods are described later.

<Evaluation Method>

(Production of Test Piece)

Surface Treatment of Resin Substrate

Plasma Treatment

Resin substrates [talc-PP (TSOP-5)] were each surface treated using FG3001 (generator) and RD1004 (nozzle-jet) (manufactured by Plasmatreat) so as to have a wetting index of 52 mN/m.

Primer Treatment

With the resin substrates having undergone the plasma treatment as above, those subjected to primer treatment with a primer (commercial name, RC-50E; manufactured by The Yokohama Rubber Co., Ltd.) and those not subjected to primer treatment were prepared.

Preparation of Test Piece

Each of the surface treated resin substrates as above was applied with a mixture of each two-part adhesive composition manufactured as above, a cationically electrodeposited steel sheet (ED sheet) was stacked thereon, and these resin substrate and cationically electrodeposited steel sheet were pressure-bonded together to have an adhesive layer of 25 mm long×10 mm wide×3 mm high therebetween, thus obtaining a laminate.

Conditions for Curing

Curing condition 1: The laminate was left to stand and cured under the conditions of 20° C. and 65% RH for 30 minutes to obtain an initial sample.

Curing condition 2: The laminate was left to stand and cured under the conditions of 20° C. and 65% RH for 24 hours to obtain a (24-hour) cured sample.

Curing condition 3: The laminate was left to stand and cured under the conditions of 20° C. and 65% RH for 1 week to obtain a 1-week cured sample.

Creep Test

The creep test was conducted with the thus-obtained initial samples and cured samples.

FIG. 1 is a schematic side view showing the creep test conducted in Examples of the technology.

In FIG. 1, a sample 1 (the initial sample of Curing condition 1, the cured sample of Cured condition 2) was used in a vertical position in the creep test. The sample 1 was formed by bonding a resin substrate 2 and a cationically electrodeposited steel sheet 4 by an adhesive layer 3. The thickness t of the adhesive layer 3 (the distance between the resin substrate 2 and the cationically electrodeposited steel sheet 4) was 3 mm. The adhesion area between the resin substrate 2 and the adhesive layer 3 is a length (corresponding to the depth of the adhesive layer 3 in FIG. 1) of 25 mm×a width $L_1$ of 10 mm of the adhesive layer 3. The same applies to the adhesion area between the cationically electrodeposited steel sheet 4 and the adhesive layer 3.

Once the laminate was cured under the relevant curing condition as above in preparation of the test piece, the sample 1 was placed to extend vertically as shown in FIG. 1, and a weight 5 was attached to the cationically electrodeposited steel sheet 4, thereby conducting the creep test under the conditions described below. A retaining time and a shifting amount (a shift in position of the top of the cationically electrodeposited steel sheet 4 between the positions before and after application of load) from the time when the weight 5 was attached to the cationically electrodeposited steel sheet 4 until the time when the cationically electrodeposited steel sheet 4 fell.

Figure 2:
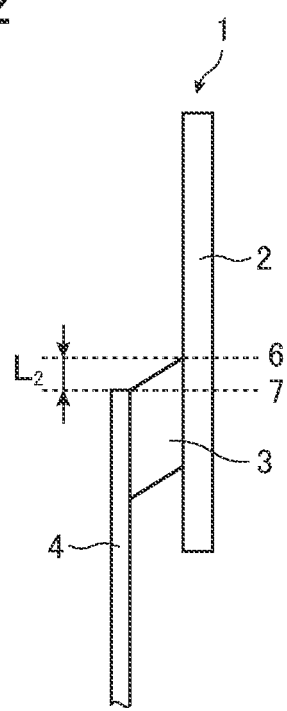
FIG. 2 is a schematic side view showing a part of a sample 1 after application of load.

FIG. 2 is a schematic side view showing a part of the sample 1 after application of load.

In FIG. 2, a position 6 represents the position of the top of the cationically electrodeposited steel sheet 4 before application of load. A position 7 represents the position of the top of the cationically electrodeposited steel sheet 4 after application of load. A shifting amount $L_2$ represents the distance between the position 6 and the position 7.

Conditions for Creep Test

The following five patterns of creep tests were conducted in this experiment.

(1) Creep test 1: A primer-coated initial sample was loaded with a weight (0.77 kg; the same applies below) corresponding to a creep stress of 30 kPa under the conditions of a test temperature of 20° C. and a relative humidity of 65% (loading time: up to 1 hour). (Curing condition: 1)

(2) Creep test 2: A primer-coated cured sample was loaded with a weight (0.13 kg; the same applies below) corresponding to a creep stress of 5 kPa under the condition of a test temperature of 80° C. (loading time: up to 48 hours).

(3) Creep test 3: A primerless initial sample was loaded with the weight corresponding to a creep stress of 30 kPa under the conditions of a test temperature of 20° C. and a relative humidity of 65% (loading time: up to 1 hour).

(4) Creep test 4: A primerless cured sample was loaded with the weight corresponding to a creep stress of 5 kPa under the condition of a test temperature of 80° C. (loading time: up to 48 hours).

(5) Creep test 5: In Creep test 3, the weight was changed to a weight with different heaviness, and the evaluation was made on the heaviness of a weight that fell from the sample together with a part of the sample during 1 hour after start of the creep test.

(Evaluation Criteria of Each Creep Test)

In the present technology, the adhesion was evaluated based on integrated results of evaluations of Creep tests 1 to 5 and the adhesion force. Evaluation criteria of each creep test are as follows.

Creep Test 1 (with a Primer; Initial Sample), Creep Test 3 (Primerless; Initial Sample)

A (excellent): The retaining time (time during which a weight did not fall; hereinafter the same) was not less than 1 hour, and the shifting amount was less than 1 mm.

The loading time for initial creep is 1 hour, and thus, a retaining time of not less than 1 hour represents that the state where a weight hangs from a sample is kept for not less than 1 hour from the start of the creep test.

B (good): The retaining time was not less than 1 hour, and the shifting amount was not less than 1 mm.

C (fair): The retaining time was not less than 20 minutes and less than 1 hour (a weight fell from a sample along with a part of the sample after more than 20 minutes but less than 1 hour; in terms of falling, the same applies below).

D (poor): The retaining time was less than 20 minutes.

Creep Test 2 (with a Primer; Cured Sample), Creep Test 4 (Primerless; Cured Sample)

A (excellent): The retaining time was not less than 48 hours.

The loading time for cured creep is 48 hours, and thus, a retaining time of not less than 48 hours represents that the state where a weight hangs from a sample is kept for not less than 48 hours from the start of the creep test.

B (good): The retaining time was not less than 24 hours and less than 48 hours (a weight fell from a sample along with a part of the sample after more than 24 hours but less than 48 hours; in terms of falling, the same applies below).

C (fair): The retaining time was not less than 12 hours and less than 24 hours.

D (poor): The retaining time was less than 12 hours.

Creep Test 5

A (excellent): In Creep test 3 (primerless; initial sample), the state where a weight hung from a sample was kept for 1 hour after the weight was loaded, where the weight weighed 2.5 kg.

B (good): A weight fell from a sample along with a part of the sample when the weight weighed 2.5 kg, while the state where a weight hung from a sample was kept when the weight weighed 1.0 kg.

C (fair): A weight fell from a sample along with a part of the sample when the weight weighed 1.0 kg, while the state where a weight hung from a sample was kept when the weight weighed 0.5 kg.

D (poor): A weight fell from a sample along with a part of the sample when the weight weighed 0.5 kg, while the state where a weight hung from a sample was kept when the weight weighed 0.1 kg.

E (very poor): A weight fell from a sample along with a part of the sample when the weight weighed 0.1 kg.

Shear Test

The 1-week cured sample obtained after curing under Condition 3 above was subjected to a shear test (under the condition of 23° C.; pulling rate, 5.1 cm/min) according to JIS K 6850-1999 to measure the shear strength. The results of the shear strength are shown in the "adhesion force" spaces in Tables 1 to 3 (evaluation result) (see FIGS. 3A-5L).

Evaluation Criteria for Adhesion Force

Evaluation criteria for the adhesion force based on the shear strength are as follows.

The adhesion force was evaluated to be high when the shear strength was not less than 3.0 MPa.

The adhesion force was evaluated to be low when the shear strength was less than 3.0 MPa.

[Evaluation Criteria for Adhesion] (Integrated Evaluation Criteria for Adhesion Using Creep Tests 1 to 5 and Adhesive Force)

In the present technology, the adhesion was evaluated to be excellent when at least three of evaluation results of Creep tests 1 to 4 were good (B) or better (one result being fair (C) or poor (D) is acceptable), the evaluation result of Creep test 5 was poor (D) or better, and the shear strength was not less than 3.0 MPa.

In the foregoing case, the adhesion was evaluated to be more excellent when at least one of evaluation results of Creep tests 1 to 4 was excellent (A), when all of evaluation results of Creep tests 1 to 4 were good (B) or better, when the evaluation result of Creep test 5 was fair (C) or better, or the shear strength was more than 3.0 MPa.

In contrast, the adhesion was evaluated to be poor when two or more of evaluation results of Creep tests 1 to 4 were fair (C) or worse, when the evaluation result of Creep test 5 was very poor (E), or when the shear strength was less than 3.0 MPa.

As evident from the results shown in Tables 1 to 3 (in FIGS. 3A-5L), in comparison to Example 1, Comparative Example 1 in which the curing agent did not contain water and the average active hydrogen concentration (BWH-c) and the ratio R3 in the mixture of the main agent and the curing agent were out of the predetermined ranges had poor results of Creep tests 3, 4, and 5 and the adhesion force, which revealed poor adhesion.

Comparative Example 2 in which the ratio R2 and the ratio R3 in the mixture of the main agent and the curing agent were out of the predetermined ranges had poor results of Creep tests 1, 3, and 5, which revealed poor adhesion.

Comparative Example 9 in which the curing agent does not contain the compound represented by Formula (4) had poor results of Creep tests 1, 3, and 5, which revealed poor adhesion.

In comparison to Example 6, Comparative Example 3 in which the curing agent did not contain the compound represented by Formula (4) and instead contained the comparative active hydrogen-containing compound had poor results of Creep tests 3, 4, and 5 and the adhesion force, which revealed poor adhesion.

Comparative Example 4 in which the curing agent did not contain water had poor results of Creep test 5 and the adhesion force, which revealed poor adhesion.

Comparative Example 10 in which the curing agent did not contain the compound represented by Formula (4) had poor results of Creep tests 1, 3, and 5, which revealed poor adhesion.

In comparison to Example 12, Comparative Example 5 in which the curing agent did not contain water and the average active hydrogen concentration (BWH-c) and the ratio R3 were out of the predetermined ranges had poor results of Creep tests 1 to 5 and the adhesion force, which revealed poor adhesion.

Comparative Example 6 in which the curing agent did not contain water and the average active hydrogen concentration (BWH-c) and the ratio R3 were out of the predetermined ranges had poor results of Creep tests 3 to 5 and the adhesion force, which revealed poor adhesion.

Comparative Example 7 in which the curing agent did not contain water and the ratio R3 was out of the predetermined range had poor results of Creep test 5 and the adhesion force, which revealed poor adhesion.

Comparative Example 8 in which the curing agent did not contain the compound represented by Formula (4) and instead contained the comparative active hydrogen-containing compound had poor results of Creep tests 3 and 4 and the adhesion force, which revealed poor adhesion.

Comparative Example 11 in which the water content was smaller than that of Comparative Example 8 and the ratio R3 was out of the predetermined range in addition to the above condition of Comparative Example 8 had poor results of Creep tests 3 to 5 and the adhesion force, which revealed poor adhesion. The results of Creep tests 3 and 5 and the adhesion force were poorer in Comparative Example 11 than in Comparative Example 8.

In contrast, the two-part urethane adhesive compositions of the technology had excellent adhesion.

What is claimed is:

1. A two-part urethane adhesive composition comprising: a first agent containing a polyisocyanate component (A); and a second agent, acting as a curing agent, containing water and an active hydrogen-containing compound (B) having a plurality of active hydrogens, wherein the active hydrogen-containing compound (B) contains a nitrogen-containing compound represented by Formula (4), in the first agent, the polyisocyanate component (A) contains a urethane prepolymer (A-3) formed using an active hydrogen-containing compound (A-1) having a plurality of active hydrogens and an isocyanate compound (A-2) having two or more functionalities, and a ratio R1 of a number of isocyanate groups of the isocyanate compound (A-2) to a number of active hydrogens (A1-H) of the active hydrogen-containing compound (A-1) (NCO/H) is 1.5 to 10, in the second agent, an average active hydrogen concentration (BH-c) of the active hydrogen-containing compound (B) is 0.50 to 3.50 mol/kg, and an average active hydrogen concentration (BWH-c) of the active hydrogen-containing compound (B) and the water is 2.00 to 8.00 mol/kg, and the first gent and the second agent are mixed in such amounts as to satisfy conditions that a ratio R2 of a number of isocyanate groups of the polyisocyanate component (A) to a number of active hydrogens (B-H) of the active hydrogen-containing compound (B) (NCO/H) is 1 to 5, and a ratio R3 of a number of isocyanate groups of the polyisocyanate component (A) to a total number of active hydrogens of the active hydrogen-containing compound (B) and the water (NCO/H) is 0.5 to 2.5, provided that the active hydrogen-containing compound (B) has no silicon,

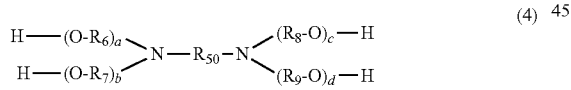

(4)

where R6 to R9 each independently represent an alkylene group, R10 represents an alkylene group or a polyoxyalkylene group, and a to d each independently represent 0 to 10.

2. The two-part urethane adhesive composition according to claim 1, wherein the urethane prepolymer (A-3) contains an unreacted isocyanate compound (A-2') having two or more functionalities.

3. The two-part urethane adhesive composition according to claim 1, wherein the first agent further contains a silane coupling agent (F), the silane coupling agent (F) contains a silane coupling agent (F-1) and/or a monosulfide-containing silane coupling agent (F-2), the silane coupling agent (F-1) being obtained by reacting a modified product of aliphatic polyisocyanate and an amino silane coupling agent, and having a skeleton derived from the modified product and an isocyanate group, wherein the modified product of aliphatic polyisocyanate is selected from the group consisting of an isocyanurate, a biuret, and an allophanate of a hydrocarbon compound having plural isocyanate groups.

4. The two-part urethane adhesive composition according to claim 3, wherein the silane coupling agent (F) contains the silane coupling agent (F-1).

5. The two-part urethane adhesive composition according to claim 3, wherein the modified product of aliphatic polyisocyanate contains a biuret of hexamethylene diisocyanate.

6. The two-part urethane adhesive composition according to claim 3, wherein the amino silane coupling agent has an $NH_2$ group or an NH group, and in the amino silane coupling agent, a number of $NH_2$ groups is zero or one per molecule of the amino silane coupling agent, and a total number of $NH_2$ groups and NH groups is one or more.

7. The two-part urethane adhesive composition according to claim 1, wherein the first agent further contains at least one aliphatic diisocyanate derivative (C) selected from the group consisting of isocyanurates, biurets, and allophanates of aliphatic diisocyanates, provided that the aliphatic diisocyanate derivative (C) has no silicon, and a content of the aliphatic diisocyanate derivative (C) is 0.1 to 10 mass % of a total amount of the first agent.

8. The two-part urethane adhesive composition according to claim 1, wherein the second agent contains at least one selected from the group consisting of: a nitrogen-containing compound 1 represented by Formula (4), where $R_6$ to $R_9$ each independently represent a propylene group and/or an ethylene group, $R_{10}$ represents an alkylene group with 2 to 10 carbon atoms, a to d each independently represent 1 to 10, and at least one of a to d is 3 or more; a nitrogen-containing compound 2 represented by Formula (5); and a nitrogen-containing compound 3 represented by Formula (4), where $R_6$ to $R_9$ each independently represent an alkylene group, $R_{10}$ represents a polyoxyalkylene group, and a to d each represent 0,

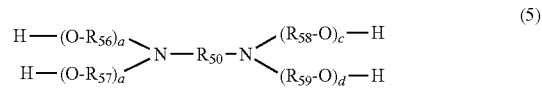

(5)

where $R_{56}$ to $R_{59}$ each independently represent a propylene group and/or an ethylene group, $R_{50}$ represents an alkylene group with 2 to 10 carbon atoms, a to d each independently represent 1 or 2, and at least one of a to d is 2.

9. The two-part urethane adhesive composition according to claim 8, wherein the second agent contains the nitrogen-containing compound 1, and further contains the nitrogen-containing compound 2 and/or the nitrogen-containing compound 3.

10. The two-part urethane adhesive composition according to claim 1, wherein the second agent further contains a compound (D) having an alkoxysilyl group and/or a silanol group, and a content of the compound (D) in the second agent is 0.002 to 5 mass % of a total amount of the composition.

11. The two-part urethane adhesive composition according to claim 10, wherein the compound (D) contains an amino silane coupling agent having a plurality of amino groups.

12. The two-part urethane adhesive composition according to claim 11, wherein the amino silane coupling agent having a plurality of amino groups has an organic chain or a siloxane skeleton as its skeleton.

* * * * *